April 19, 1938. W. M. YOUNG ET AL 2,114,951
PRETZEL MACHINE
Filed Sept. 26, 1935 22 Sheets-Sheet 1
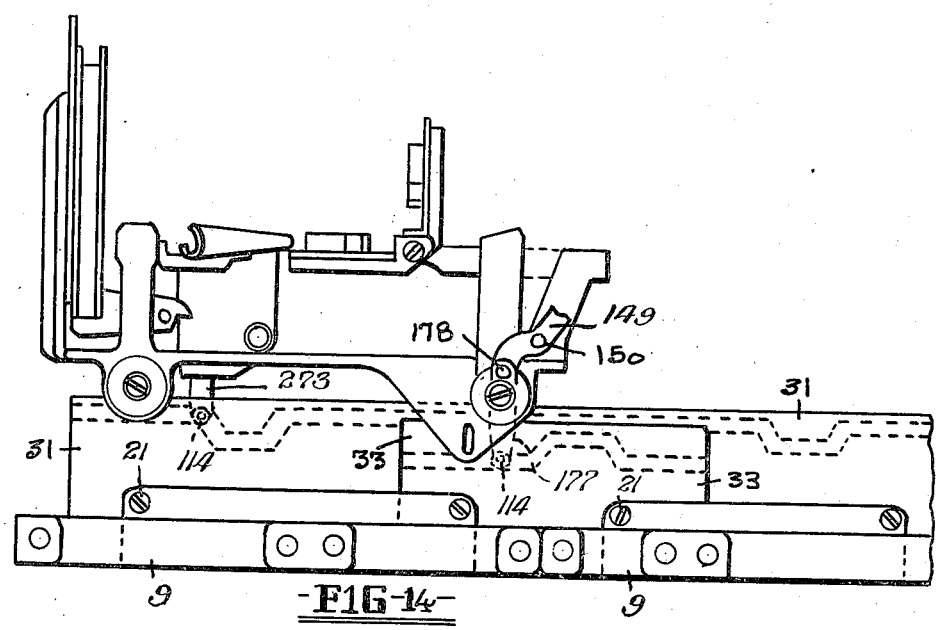
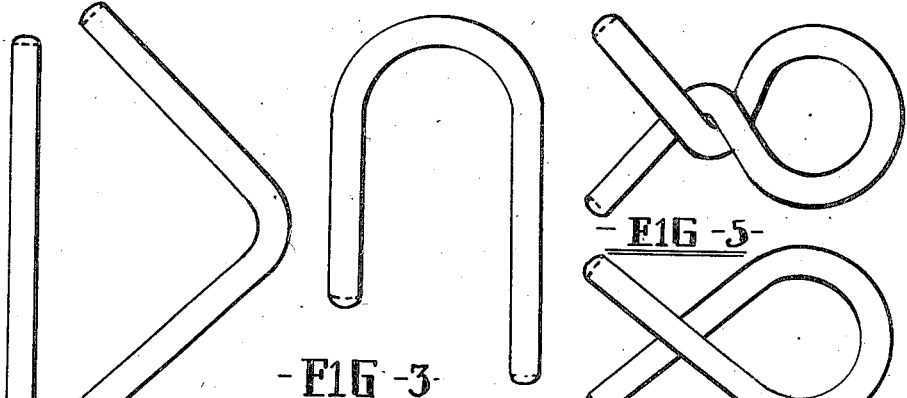
Inventors
W. M. YOUNG &
L. B. PAULES.

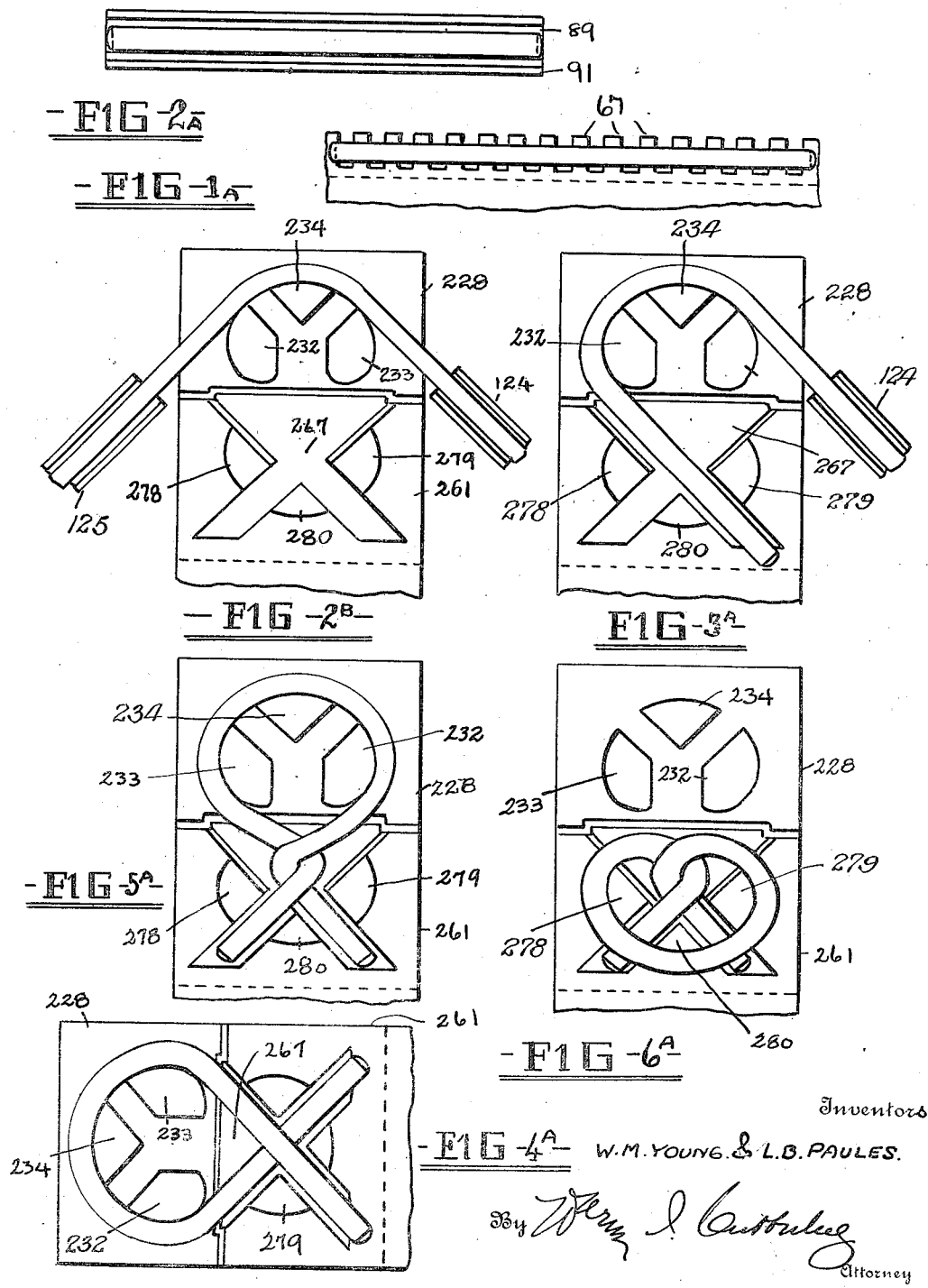

April 19, 1938.  W. M. YOUNG ET AL  2,114,951
PRETZEL MACHINE
Filed Sept. 26, 1935   22 Sheets-Sheet 3
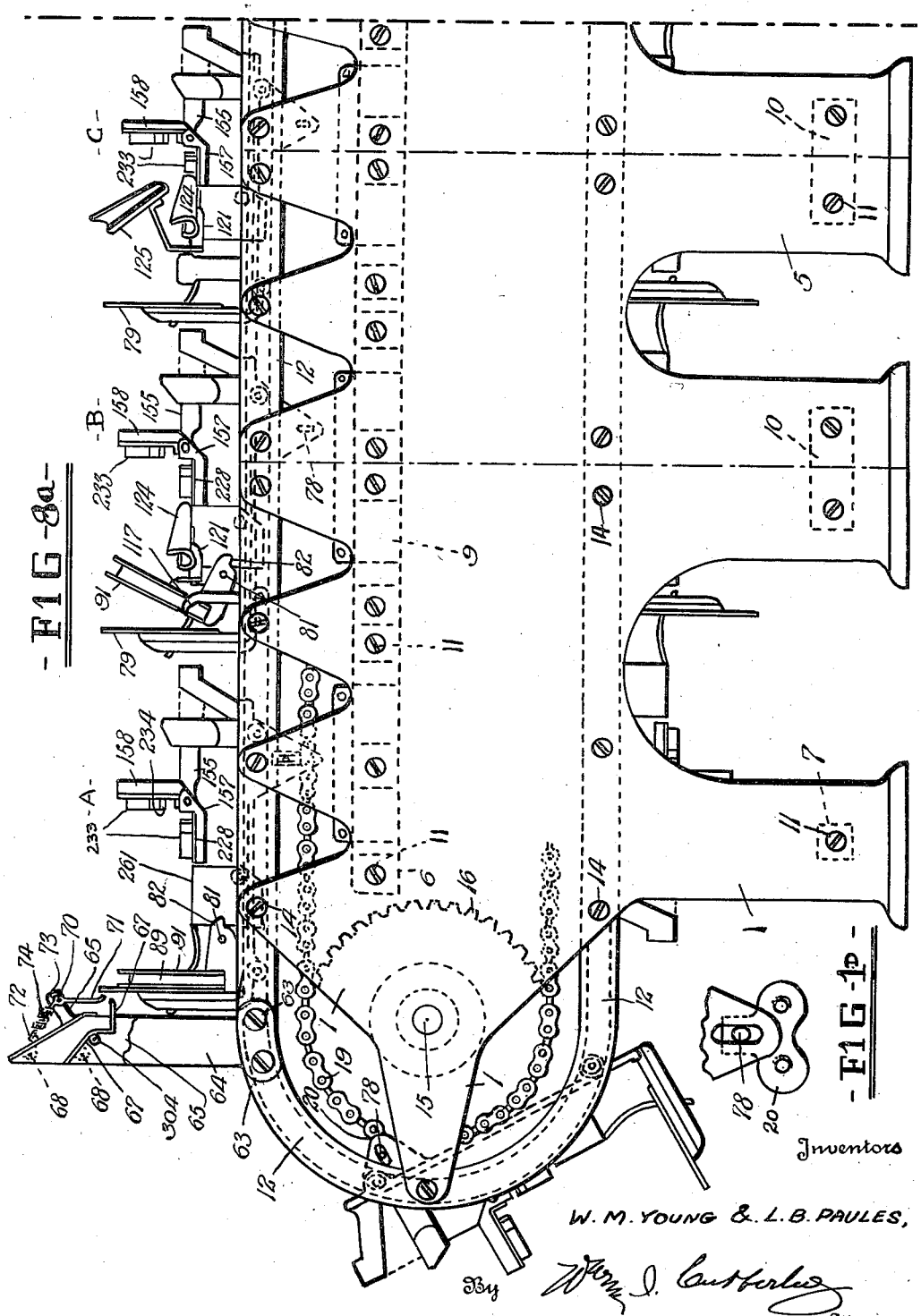

April 19, 1938.  W. M. YOUNG ET AL  2,114,951
PRETZEL MACHINE
Filed Sept. 26, 1935  22 Sheets-Sheet 4

Inventors
W. M. YOUNG & L. B. PAULES.,

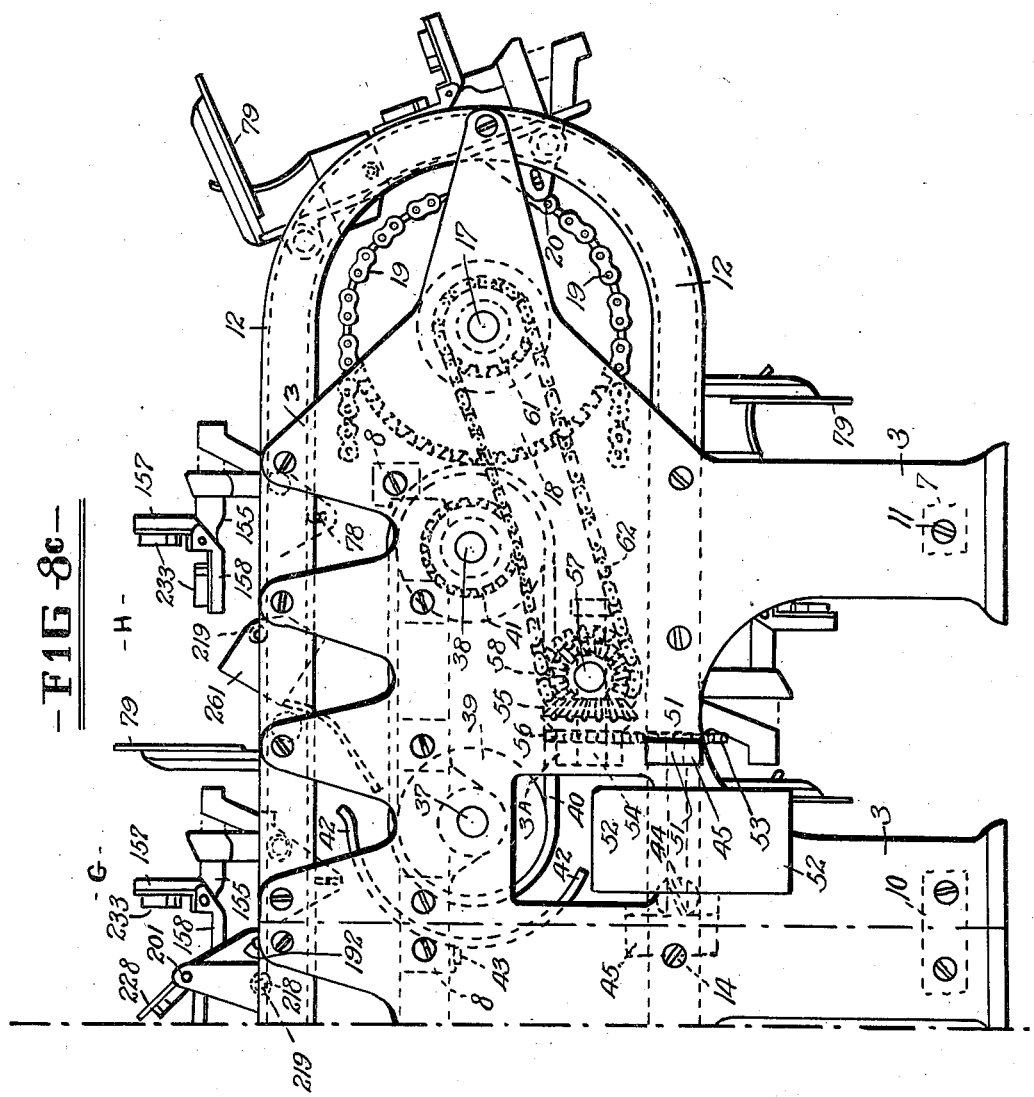

April 19, 1938.  W. M. YOUNG ET AL  2,114,951
PRETZEL MACHINE
Filed Sept. 26, 1935    22 Sheets-Sheet 6
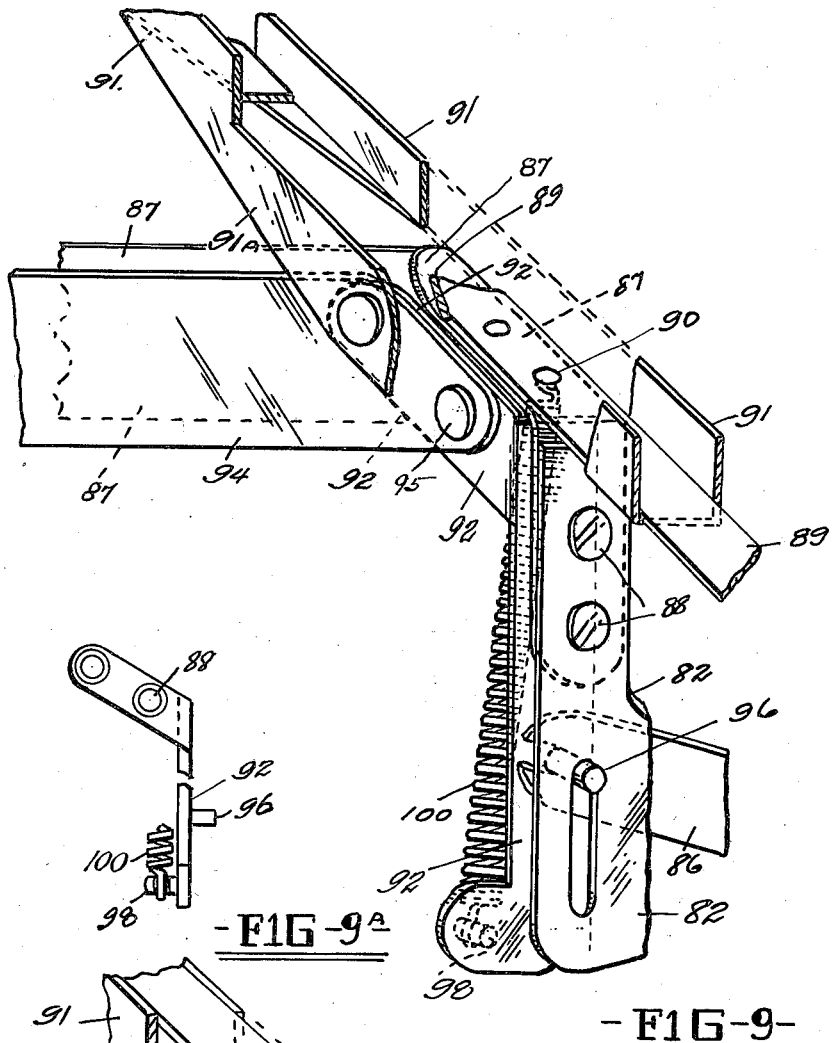
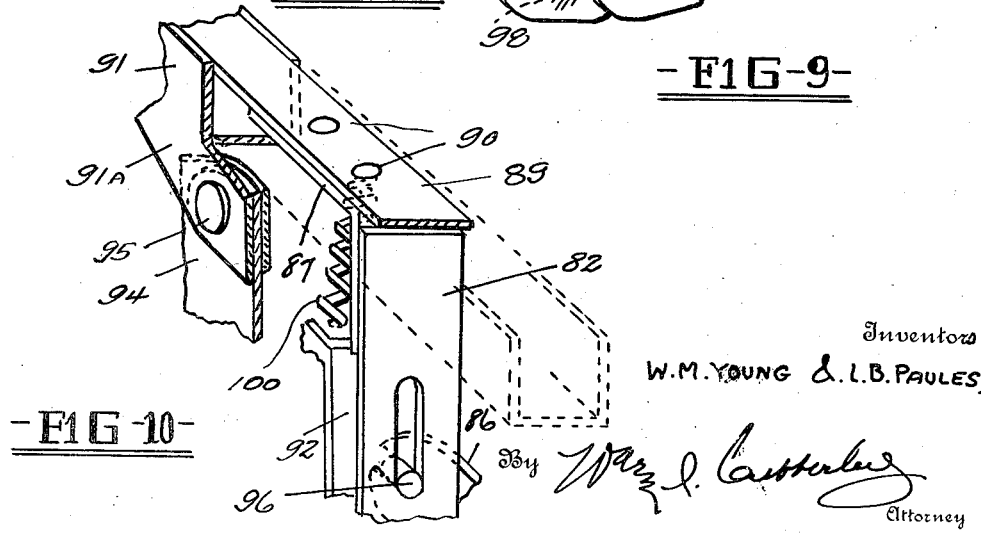
Inventors
W. M. YOUNG & L. B. PAULES
By *Warry I. Catterberg*
Attorney

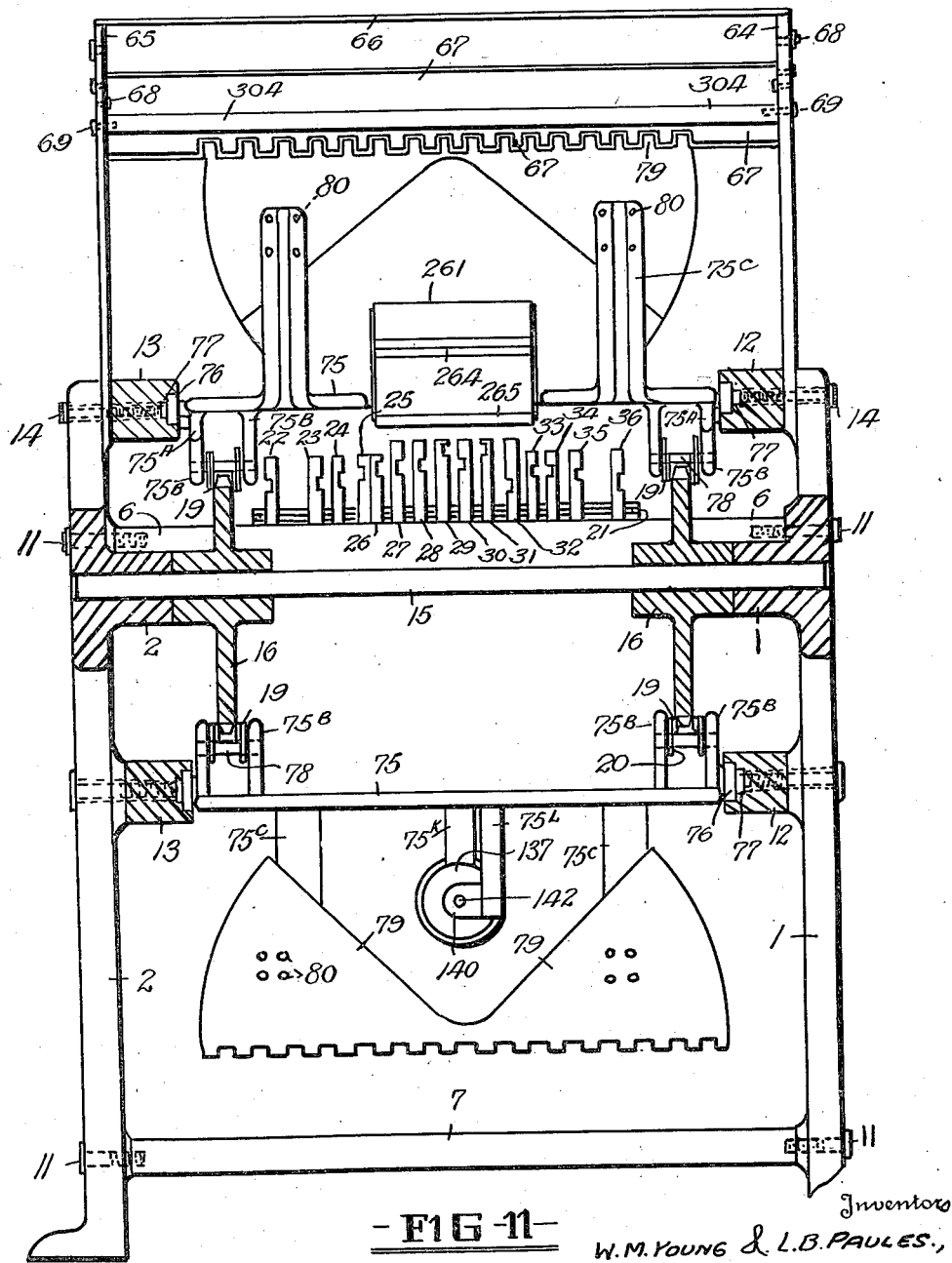

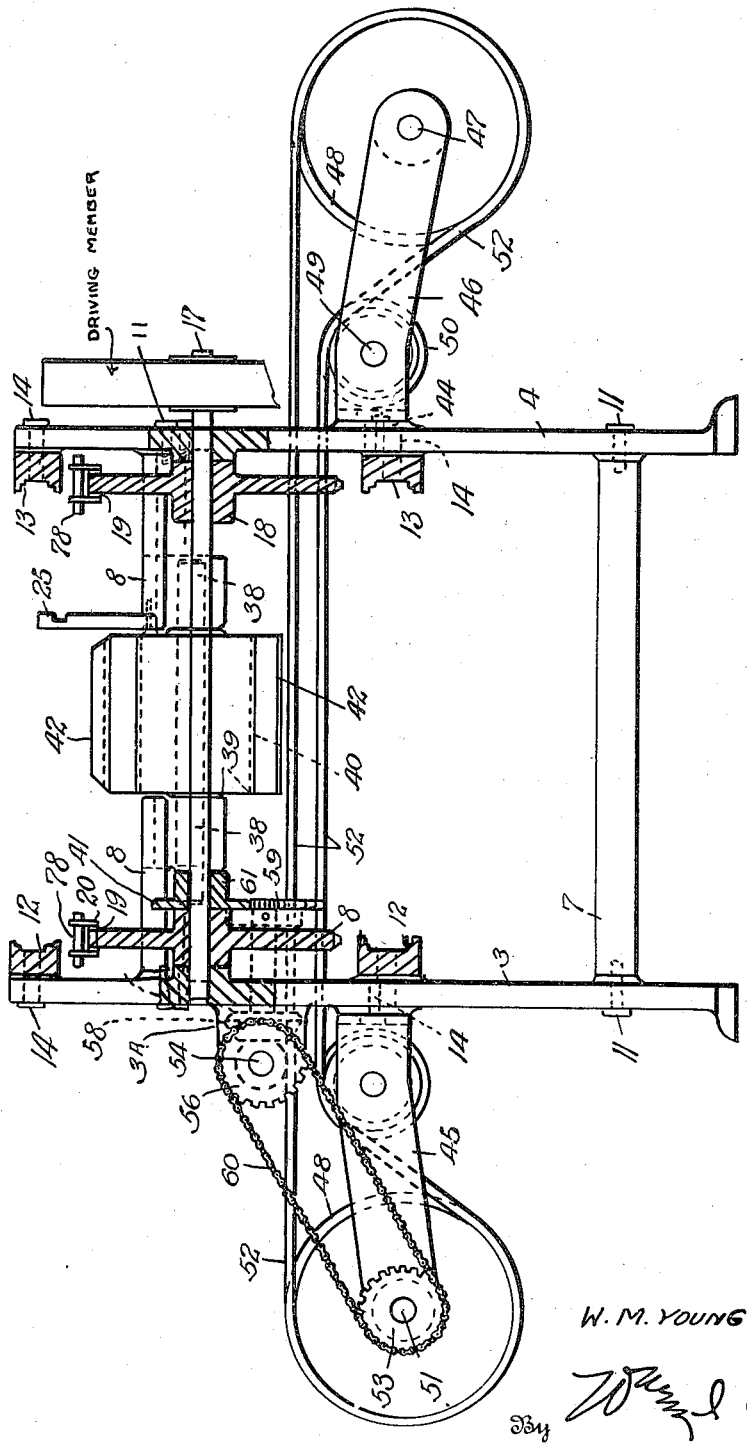

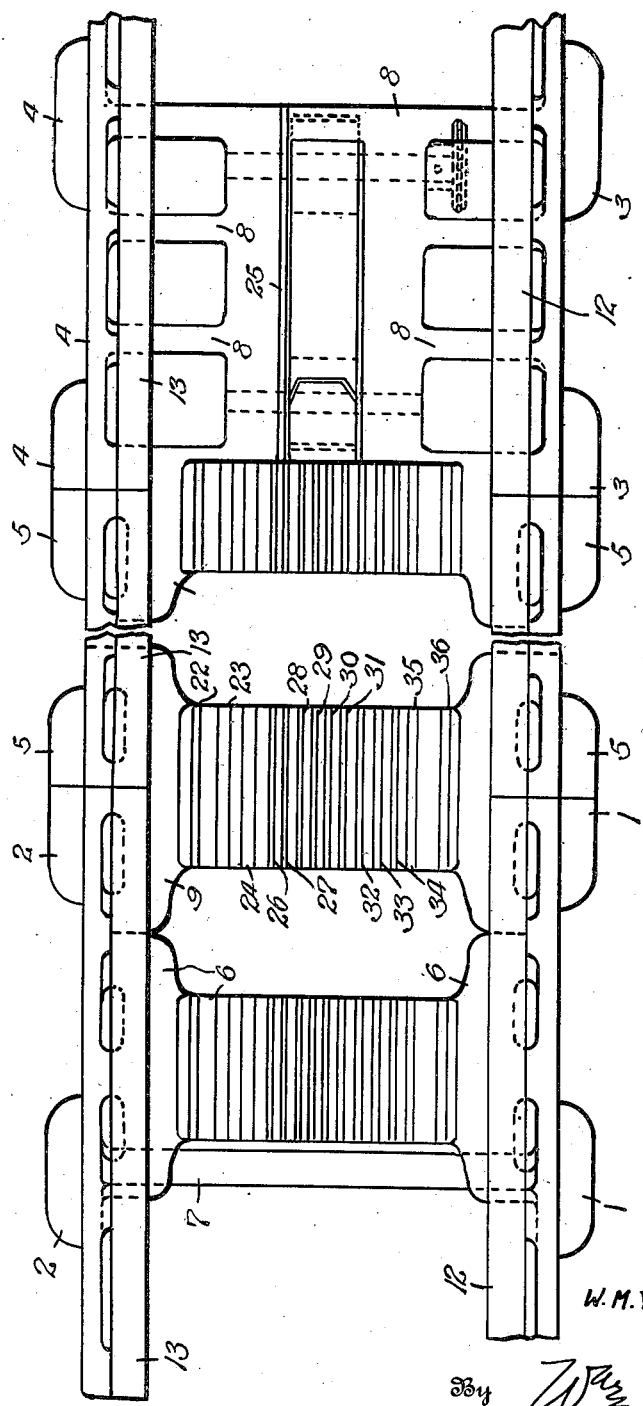

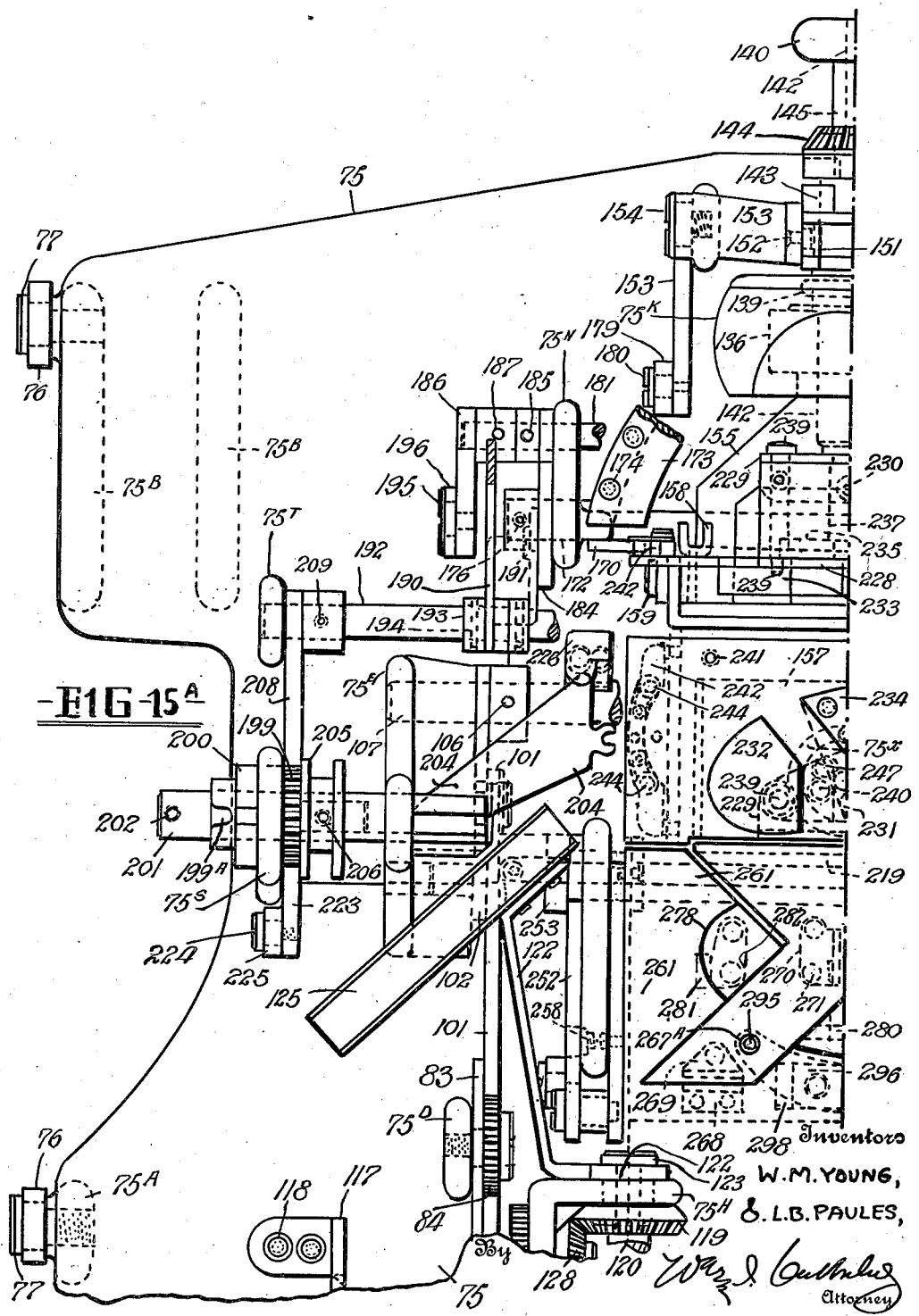

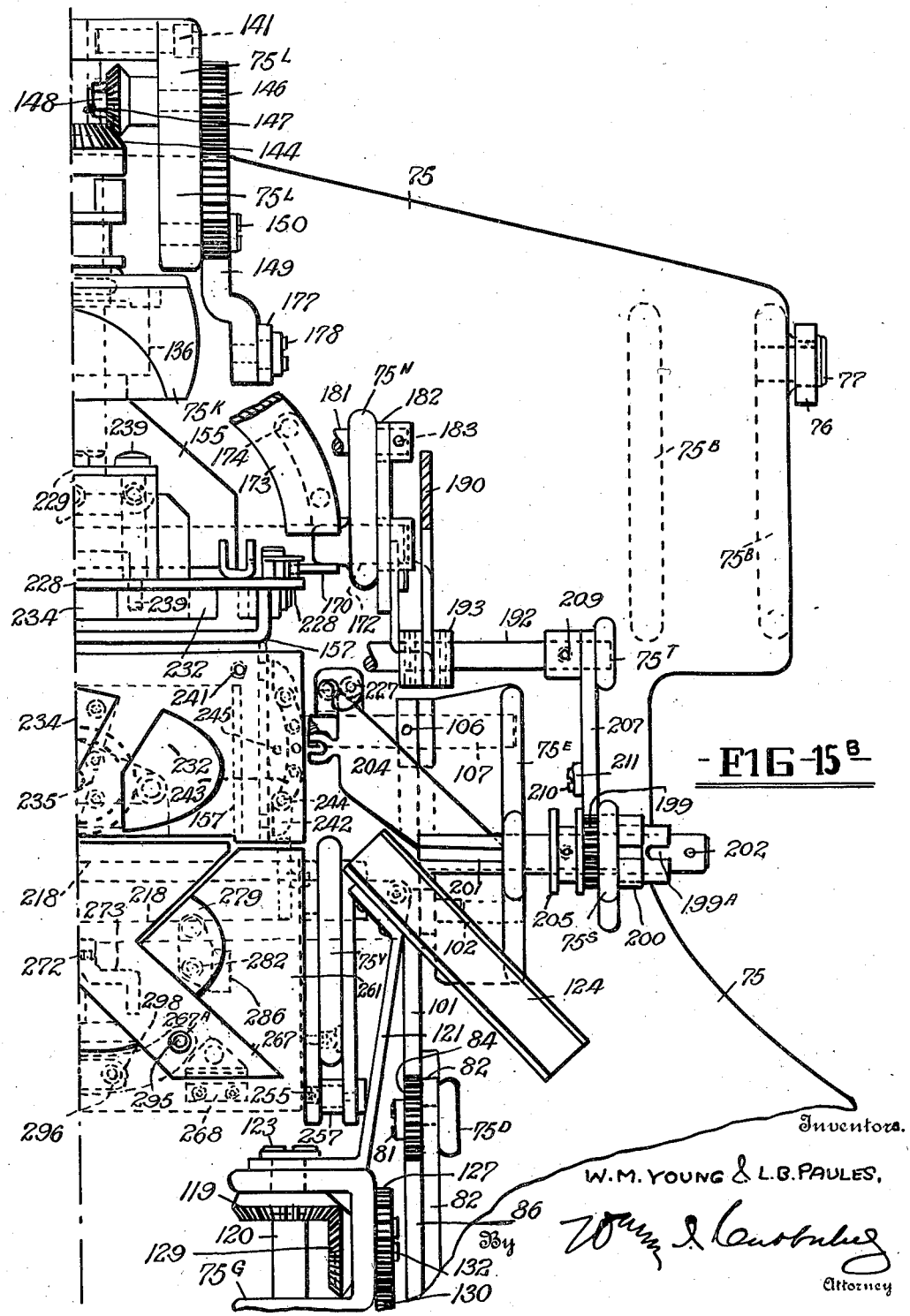

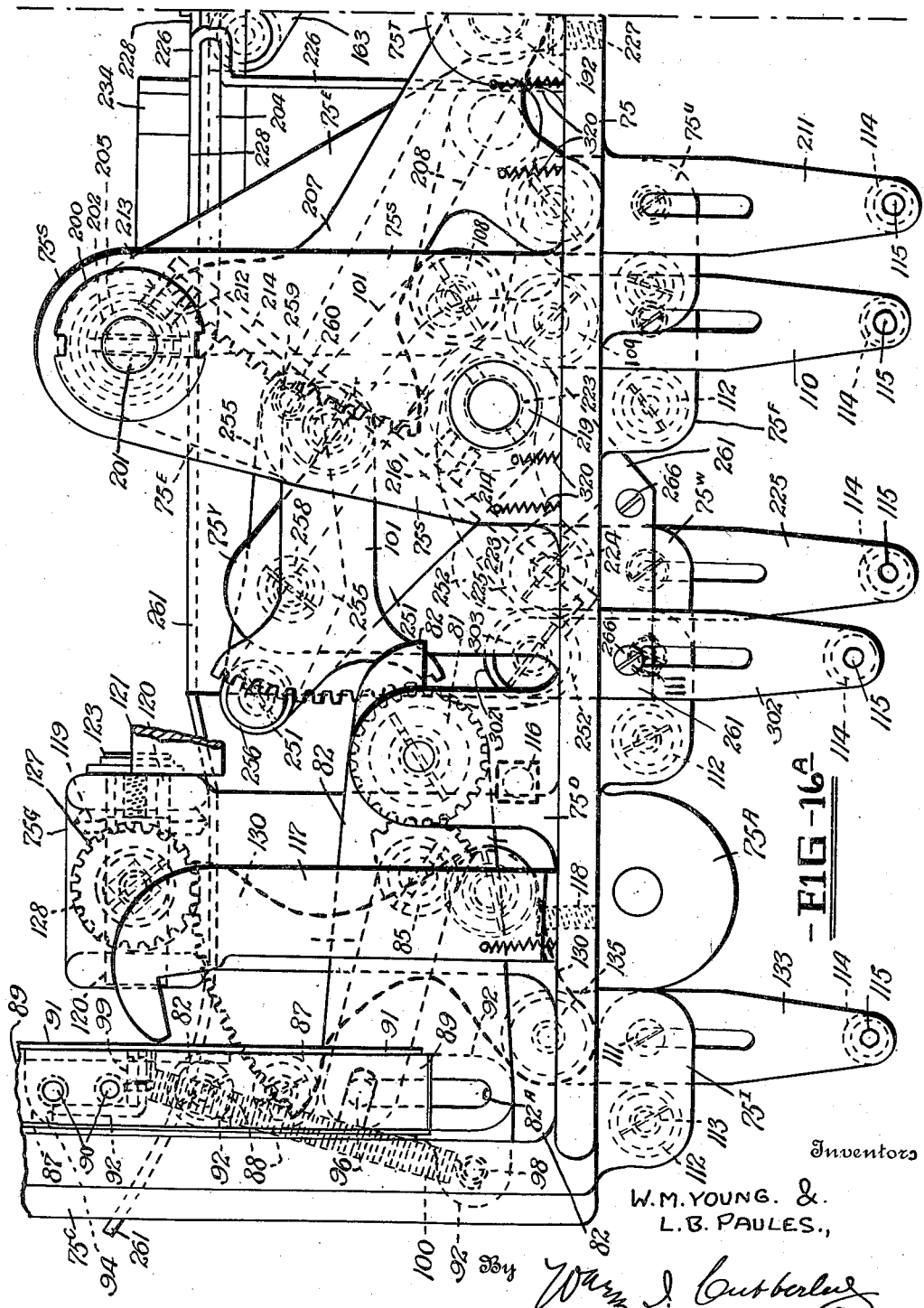

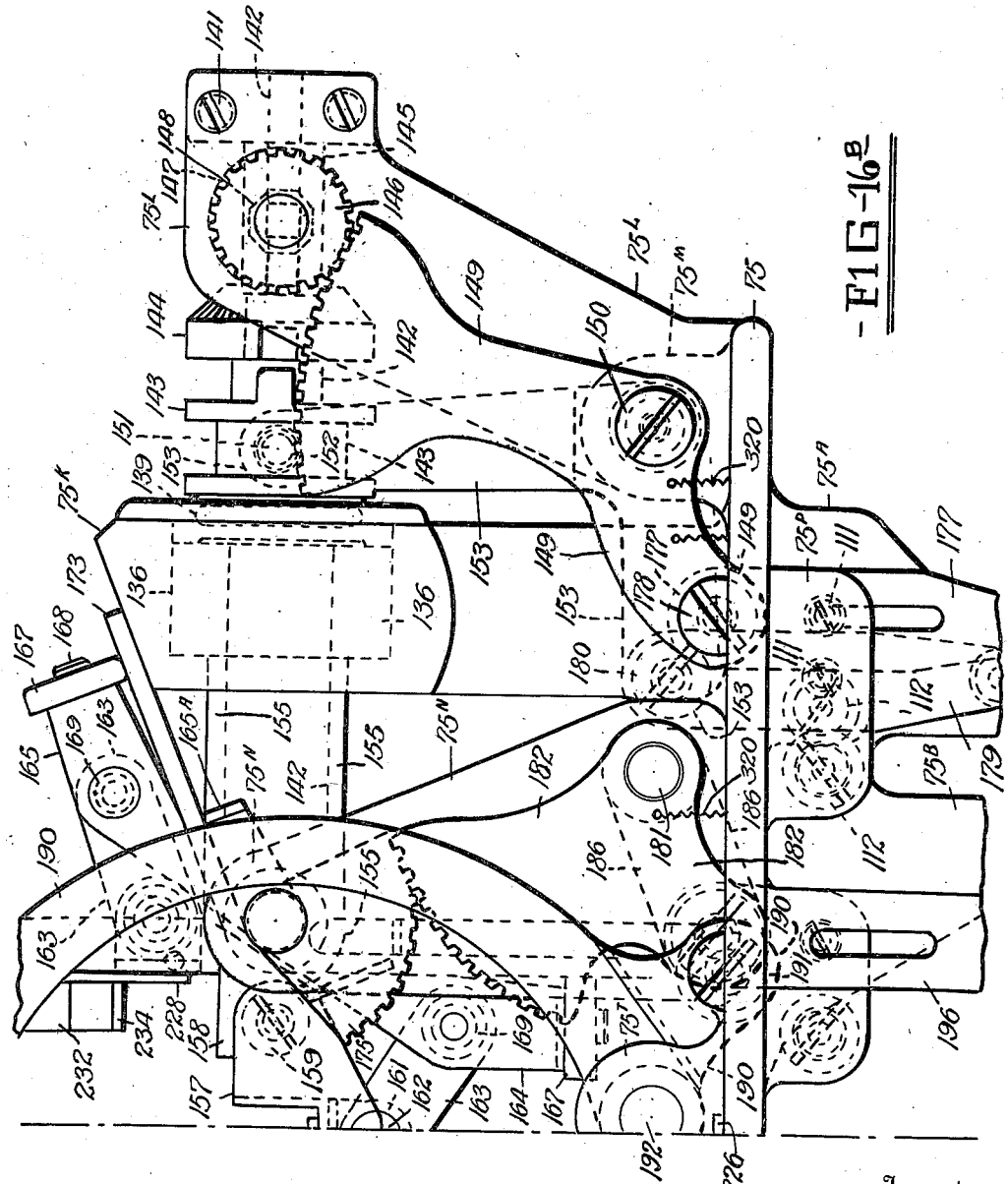

April 19, 1938.　　W. M. YOUNG ET AL　　2,114,951
PRETZEL MACHINE
Filed Sept. 26, 1935　　22 Sheets-Sheet 14
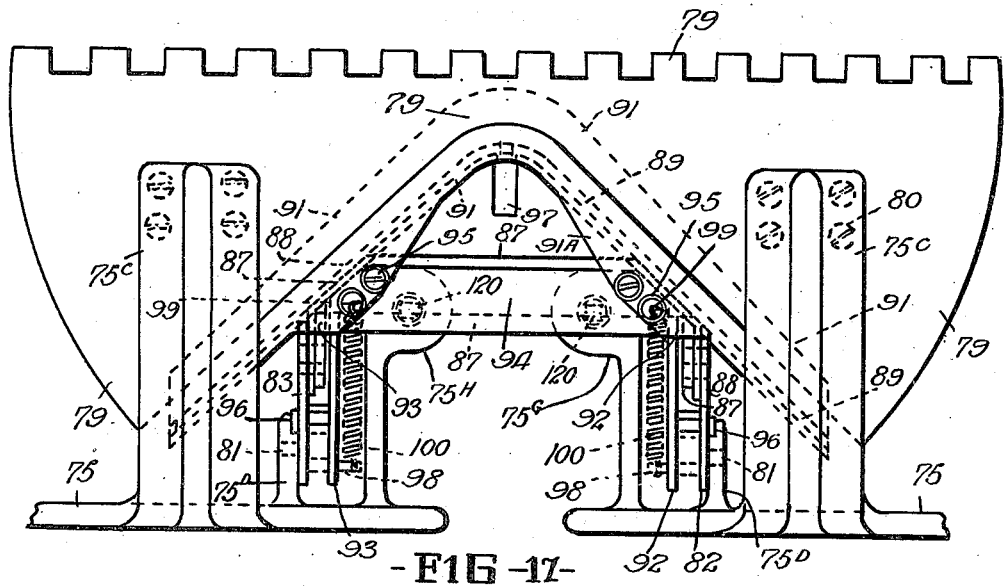
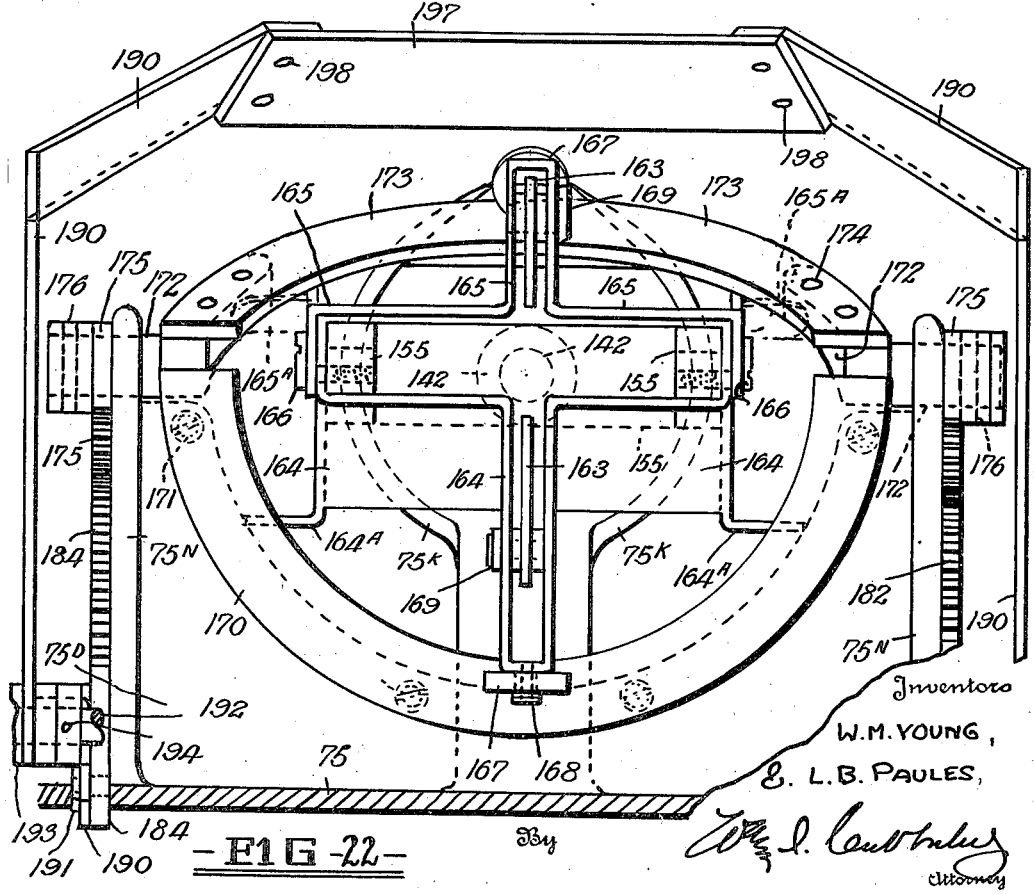
Inventors
W. M. YOUNG,
E. L. B. PAULES,
By
Attorney

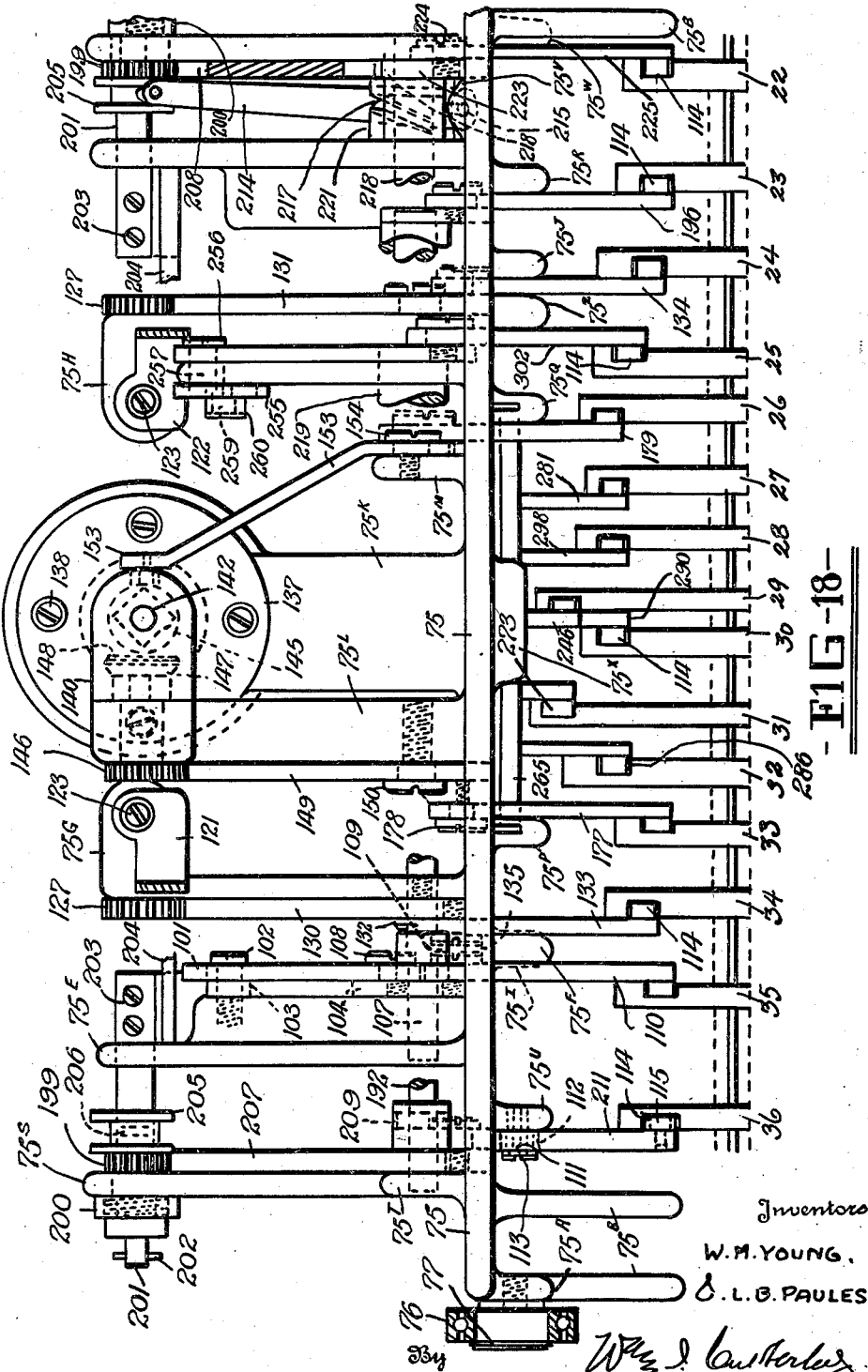

April 19, 1938.   W. M. YOUNG ET AL   2,114,951
PRETZEL MACHINE
Filed Sept. 26, 1935   22 Sheets-Sheet 16
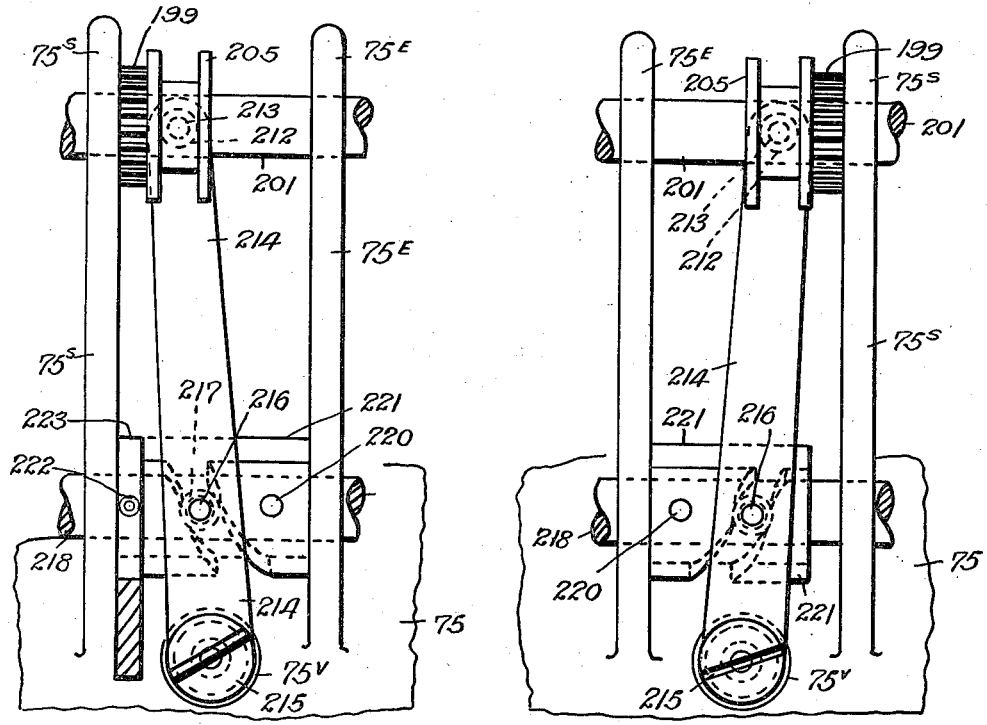
-FIG-20-   -FIG-20ᴬ-
-FIG-19ᴬ-
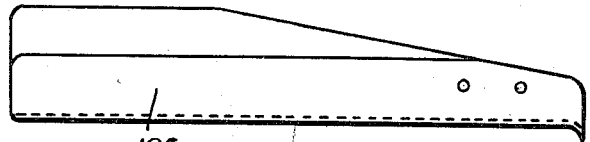
-FIG-19-
-FIG-19 ᶜ-
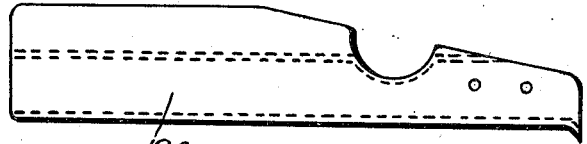
-FIG-19 ᴮ-
Inventors
W.M.YOUNG & L.B.PAULES,
By *[signature]*
Attorney

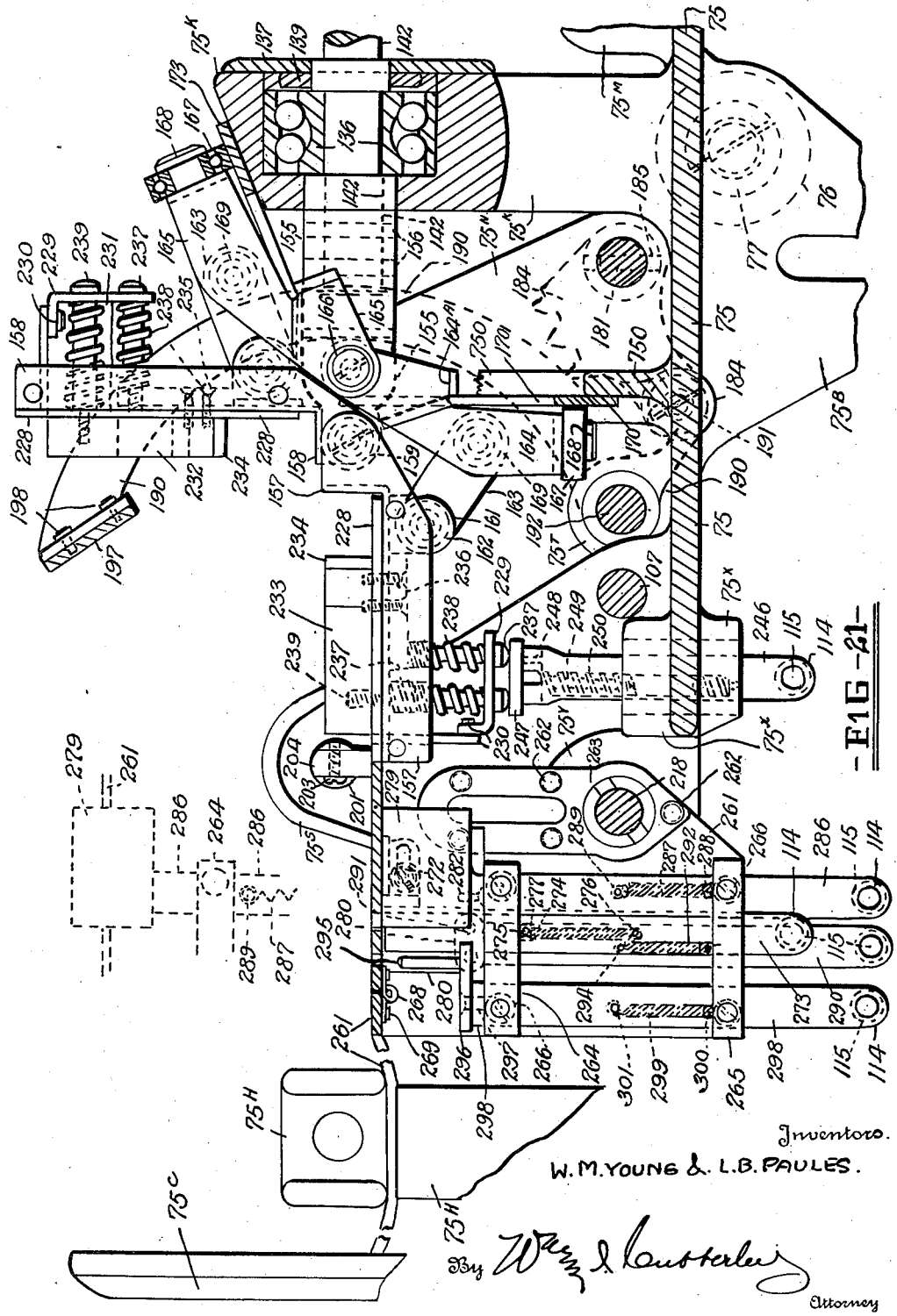

April 19, 1938. W. M. YOUNG ET AL 2,114,951
PRETZEL MACHINE
Filed Sept. 26, 1935 22 Sheets-Sheet 18
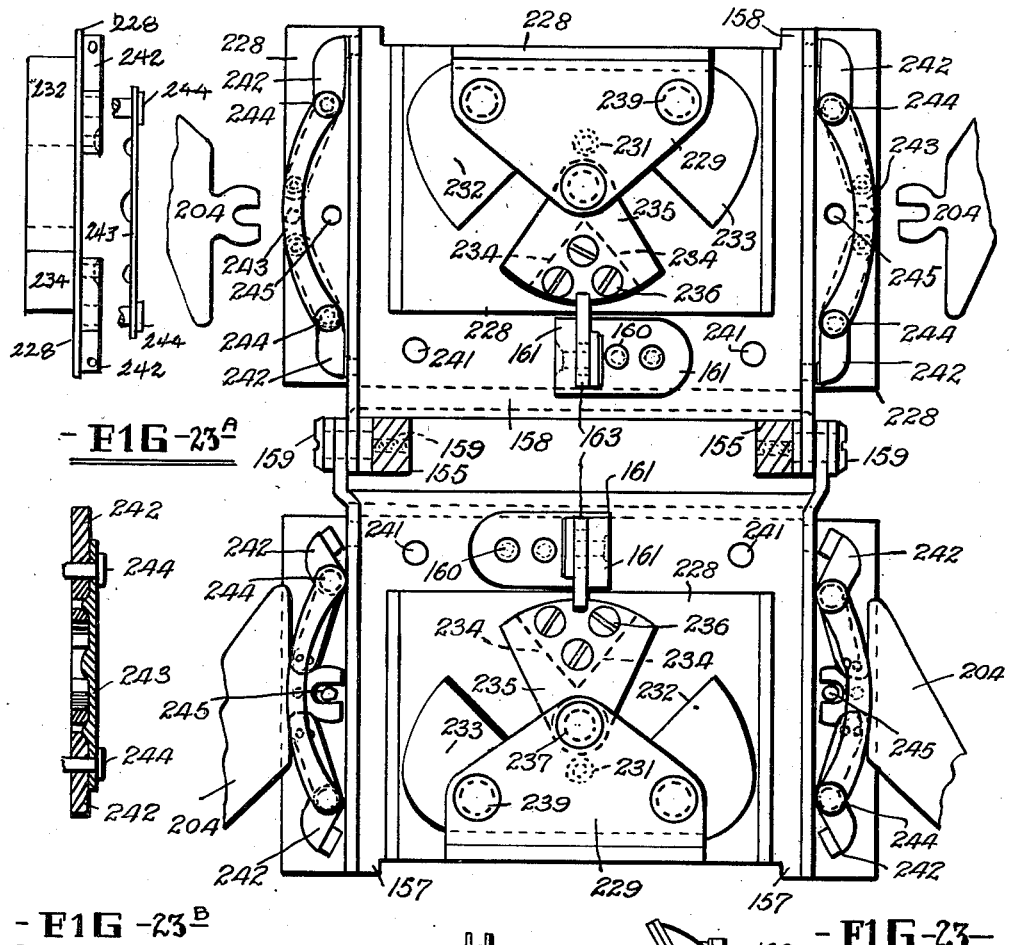
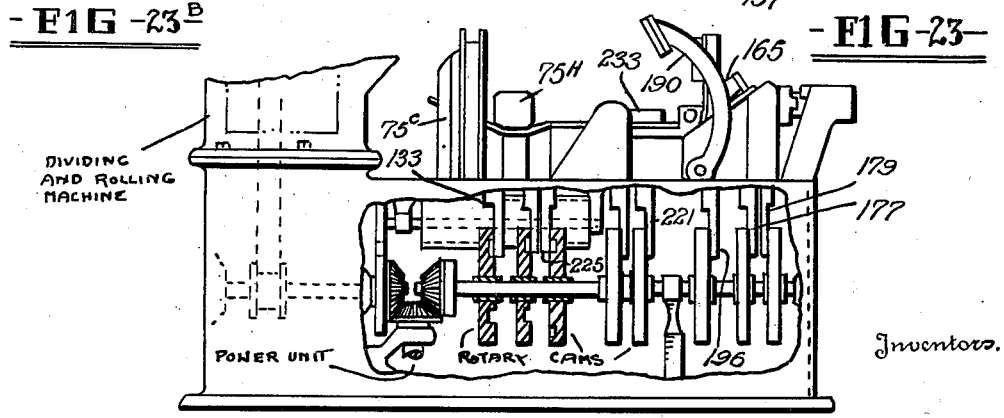
Inventors.
W. M. YOUNG & L. B. PAULES

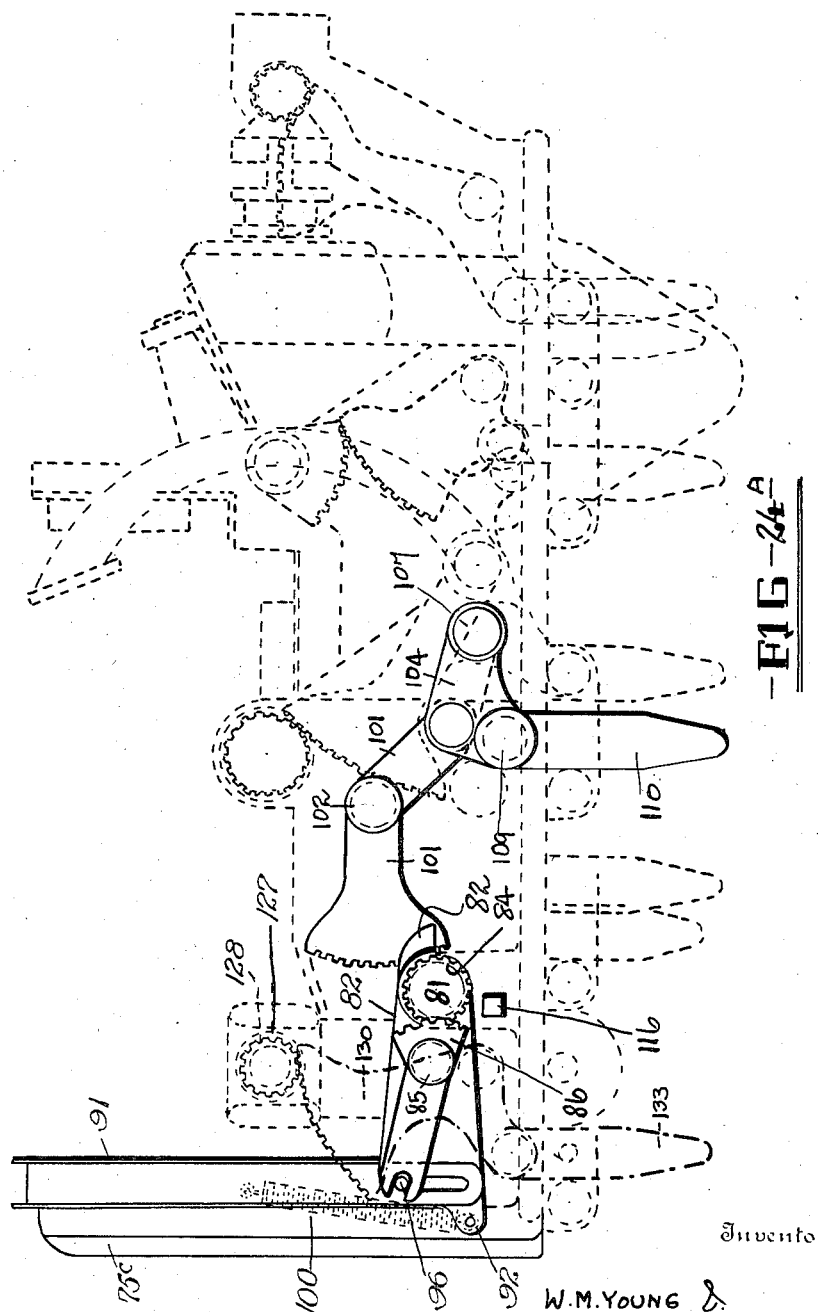

April 19, 1938.  W. M. YOUNG ET AL  2,114,951
PRETZEL MACHINE
Filed Sept. 26, 1935  22 Sheets-Sheet 20
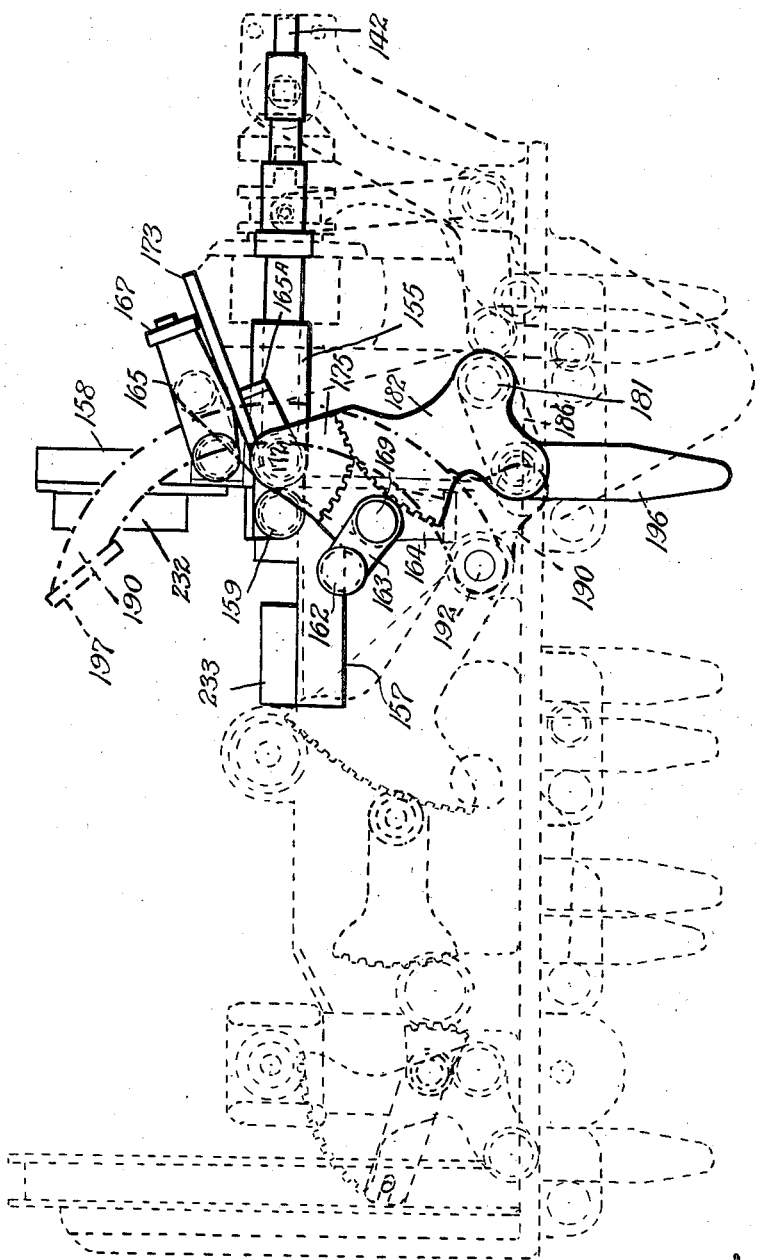
FIG-24ᴮ
Inventors
W. M. YOUNG & L. B. PAULES April 19, 1938.  W. M. YOUNG ET AL  2,114,951
PRETZEL MACHINE
Filed Sept. 26, 1935   22 Sheets-Sheet 21
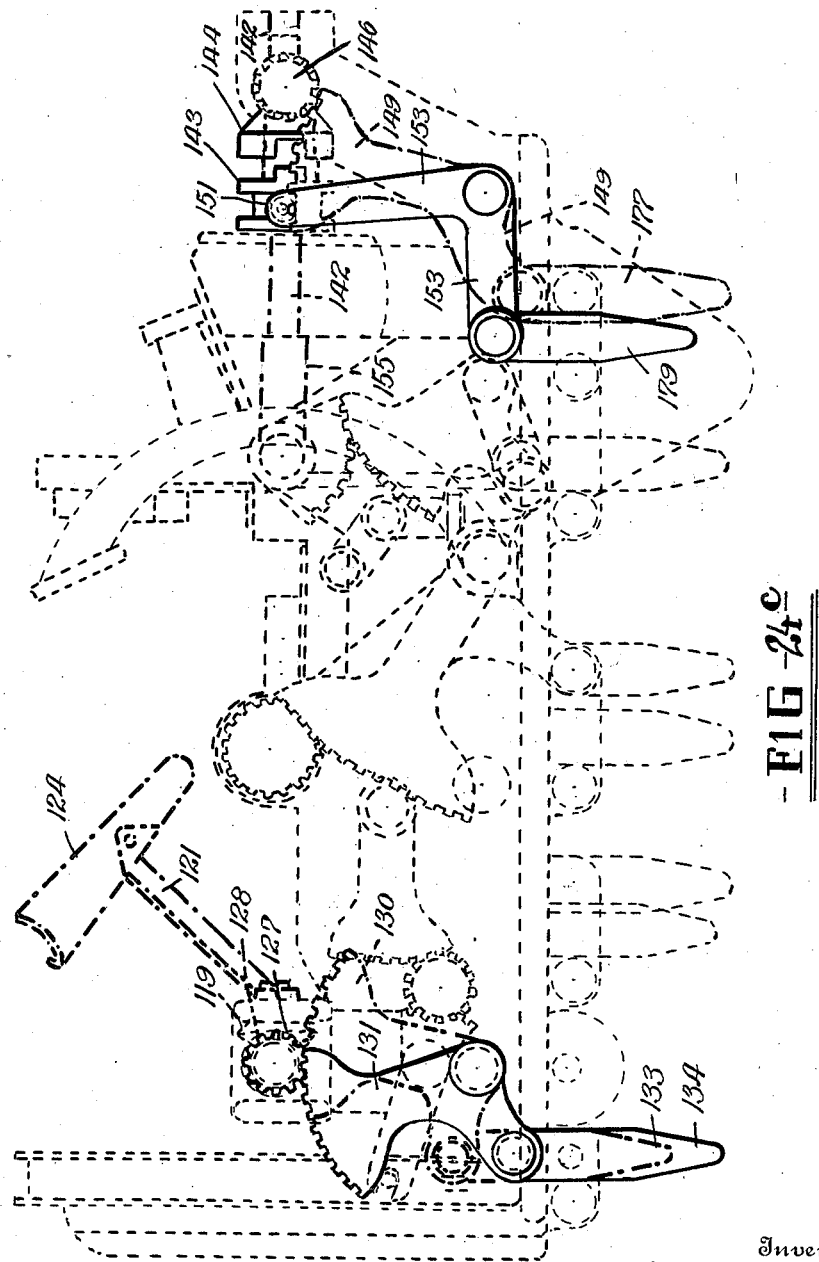
FIG 24<sup>c</sup>
Inventors.
W.M.YOUNG & L.B. PAULES

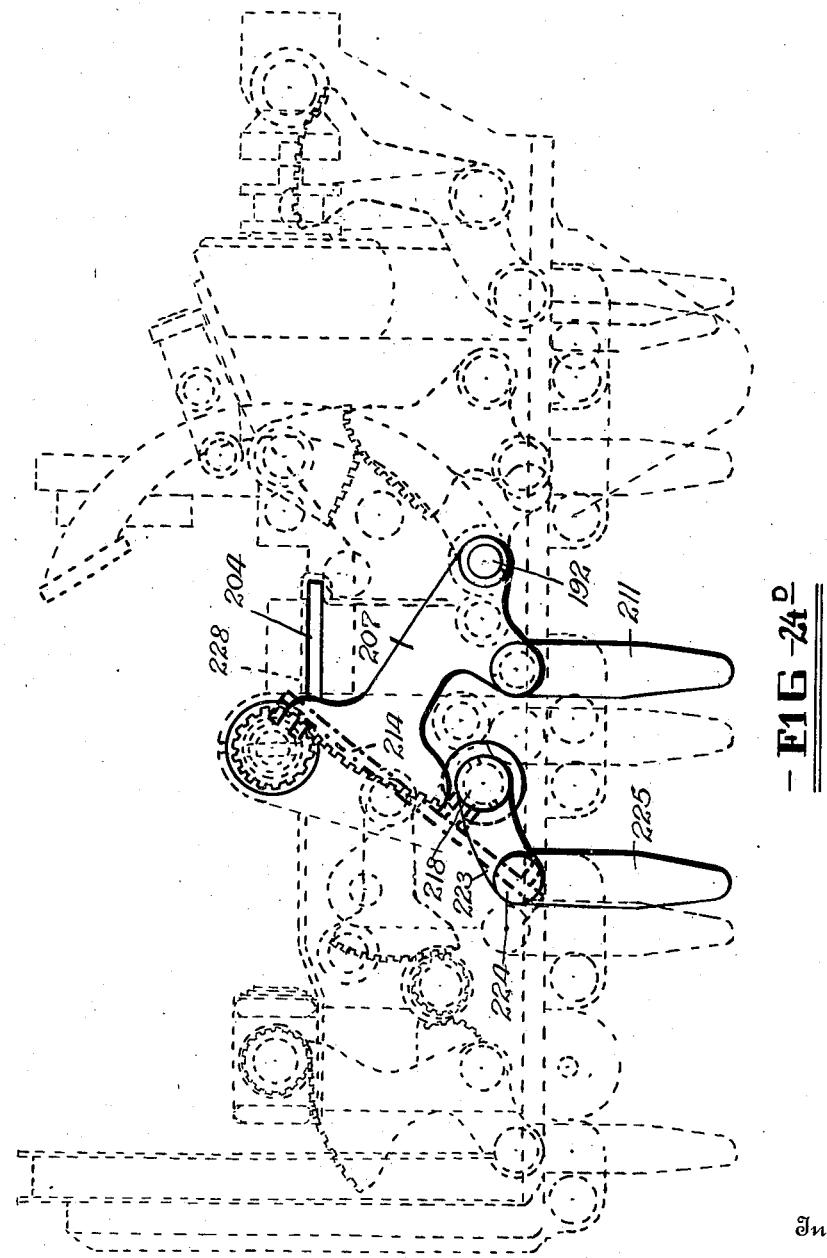

Patented Apr. 19, 1938

2,114,951

UNITED STATES PATENT OFFICE 2,114,951

PRETZEL MACHINE

William M. Young and Lemon Blair Paules, Harrisburg, Pa.

Application September 26, 1935, Serial No. 42,318

38 Claims. (Cl. 107—8)

Our invention, in its broad aspect, has reference to improvements in machines for completely forming pretzels from a strip or rod of dough delivered to it by conventional pretzel or dough rolling machines, and it is our primary purpose to complete all operations necessary to the forming of a complete pretzel mechanically, and without squeezing the dough, or otherwise manipulating the dough in such a manner that it loses any of its desirable characteristics while passing through our machine.

It is to be understood in the detailed description annexed hereto, and in applying the principles of construction of the various parts as shown in the drawings forming a part of this application that all rights are reserved with regard to making changes in construction, form, arrangement, size, position, or relationship of parts, provided such changes fall within the broad concept of our invention, and provided such changes fall within the scope and interpretation of the claims appended hereunto and forming a part of this application.

Our invention consists in the provision of a fully automatic machine for use in the making of pretzels and is designed to be used in conjunction with a machine well known to the art for producing strips or rods of dough of suitable length in preparation for the bending, twisting and folding operations which give a pretzel its shape. Such machines for producing the rod or strip of dough are now known to the trade as pretzel rolling machines, and they are designed to produce the dough form from which pretzels are now manually fabricated. As stated our machine is designed to receive the rods or strips of dough and with full automatic operation bend, twist and fold the dough, and otherwise manipulate it into completed pretzels of uniform shape and size, and deliver the same ready for dipping, salting, and baking.

As herein disclosed our invention consists in a multi-unit construction, although any one unit may be operated as a single machine and as such a single machine is within the purview of our inventive concept. The single unit construction herein referred to will produce a continuous supply of uniform pretzels, receiving the strips or rods of dough as they come from the rolling machine, ejecting them after forming at any speed up to the maximum at which movements will operate off of the rotary cams, but with a single unit construction, a strip or rod must go through the entire process of bending, twisting, folding and ejecting before another strip or rod of dough can enter the machine; while with our multi-unit construction herein described and claimed with particularity, the units are connected in cooperating relationship each to the others on endless chains, with the units running on parallel endless tracks, producing a continuous supply of uniform pretzels. Aside from the different number of pretzels produced per hour by variations in speeds, our multi-unit construction is so designed that any number of like units may be assembled to produce any desired number of pretzels per hour. The principle in this construction is different because as units are added, parallel plate cams are lengthened, and the unit travel speed past a given point is increased proportionately. Every unit as it passes through, under the feeding hopper, selects a strip or rod of dough. In the unit's travel from the point it selects the dough until it ejects the finished pretzel, it bends, twists, folds and attaches the ends of dough. This construction permits working on a multiplicity of strips or rods of dough in each continuous revolution of the machine. The base of this type machine is of sectional design and as units are added, the number of base sections are increased proportionately.

It is to be understood that each unit is identical, and any one unit may be replaced with another without impairing the operation of the machine. The operation of the machine is continuous and not intermittent.

Our invention, as described, conforms with the making of approximately the standard size pretzel; nevertheless, various changes may be made in the operative mechanism, the arrangement and the lay out of the parts without departing from the spirit of the invention. By the mere substitution of the properly sized and shaped guides, support plates, work table and carrying troughs, the machine is adapted to make pretzels of various sizes with twists either right or left.

In our machine we have provided as follows:

1. A means for receiving strips or rods of dough from a pretzel rolling machine.

2. A means for retaining and holding each strip or rod of dough in a straight shape, as shown in Figure 1, ready for removal by one of the machine's units.

3. A means for removing each strip or rod of dough from the retained position.

4. A means for deflecting each strip or rod of dough downward and against the removal plates on the units.

5. A means for receiving each strip or rod of dough as it drops, bending in the center, ends downward, and at an angle of 45 degrees to a perpendicular, as shown in Figure 2.

6. A means for moving each strip or rod of dough forward from the upright positions to the horizontal positions on the units.

7. A means for cutting any excess dough from the ends of each strip or rod of dough when the pretzel rolling machines do not produce strips or rods of dough in uniform length and crosswise location. (There are pretzel rolling machines known to the trade which do not produce strips or rods of dough of uniform length and location, crosswise of the machines. In this case the pretzel rolling machines are set to produce strips or rods of greater length than necessary to bend, twist and fold pretzels; the excess dough is removed by the aforementioned means, and returned to the rolling machines to be worked over.)

8. A means for moving each strip or rod of dough to the working positions on the units.

9. A means for keeping the bent section of each strip or rod of dough in its proper shape while ends are being moved to their proper relations.

10. A means for moving the left end of each strip or rod of dough in a rotating clockwise movement, 180 degrees, leaving it in a position 90 degrees to the right of its former position, as shown in Figure 3.

11. A means for retaining the end of each strip or rod of dough in the position in which it has been placed, as mentioned in paragraph 10.

12. A means for moving the right end of each strip or rod of dough in a rotating counter-clockwise movement, 180 degrees, leaving it in a position 90 degrees to the left of its former position, crossing the left end of each strip or rod of dough, which is now lying in a right position, forming an X with the ends of the dough, as shown in Figure 4.

13. A means for retaining the ends of the dough in the positions which they have been placed, as mentioned in paragraph 12.

14. A means for covering and guiding the bent section of each strip or rod of dough in preparation for the twisting.

15. A means for keeping the bent section of each strip or rod of dough supported, covered and in place with the guides and to retain its shape while being rotated clockwise 180 degrees to produce a twist in the dough.

16. A means for covering the ends of the dough and keeping them in their correct locations with guides while the bent section of each strip or rod of dough is rotated clockwise to produce a twist in the dough.

17. A means for moving the center sections of the units up and down so as to permit clearance when the bent section of each strip or rod of dough is rotated clockwise to obtain the twist, and as a support at the point each strip or rod of dough makes its overlap and twist, changing its support level by a double thickness of the dough.

18. A means for making a twist in each strip or rod of dough at the points where the ends overlap each other by rotating the bent section of each strip or rod of dough with its support, cover and guides in a clockwise movement, 180 degrees, while the ends are retained in the last mentioned position. The cover with its guides now becomes a support with guides, and the support with guides now becomes a cover with guides. The bent section of each strip or rod of dough now becomes a loop section.

19. A means for pushing the guides in the supports of the loop sections upward, in turn, forcing the guides in the covers to strip themselves from the loop sections of dough, permitting the covers with their guides to return to neutral positions, free of the loop sections of the dough. Each strip or rod of dough now has the shape as shown in Figure 5.

20. A means for retaining supports and covers to the support brackets which hinge on the twister rotating shafts, being locked and unlocked automatically in the proper sequence of the operations on the units.

21. A means for the positive locking of the supports to the ends of the horizontal shafts while in the same operations, the unlocking of the supports from the support brackets is accomplished. This being done in readiness for the fold of each strip or rod of dough.

22. A means for rotating the supports from the front to the rear through the medium of the horizontal shafts which lock to both sides of the supports. When facing the right side of the units, the horizontal shafts rotate the supports counter-clockwise, 180 degrees, with the loop sections of each strip or rod of dough being placed directly on the top of the ends, causing each strip or rod of dough to hinge fold at the points, which are the junctions of the twist and the loop sections. These movements complete the last formings of the pretzels, as shown in Figure 6.

23. A means for pushing the guides which hold in place the ends of the dough upward, in turn, forcing the guides in the supports to strip themselves of the completely formed pretzels.

24. A means for causing an adhesion of the ends of each formed pretzel to the loop section by penetrating through the ends of each formed pretzel and into the loop section with an upward movement of two rods, one for each end of the formed pretzel, while the supports are still over the completely formed pretzels. The only evidence on the pretzels of this operation is a small dimple on each of the ends of the pretzels. Heretofore, when the pretzels were made by manual labor, finger prints were in evidence, both top and bottom, of each pretzel, from squeezing between the thumb and the finger.

25. A means for unlocking the supports from the horizontal shafts, which have returned to their neutral positions, and the locking of the supports to the support brackets.

26. A means for moving the sections of the units, which now support the completed pretzels, in a rearward direction, approximately 60 degrees, causing the completed pretzels to slide down chutes provided for same.

27. A means for the receiving of the completed pretzels through the medium of a conveyor running away from the unit, parallel to the length of the machine.

28. A means for the turning of the pretzels right side up; (see Figure 7) as the pretzels are formed in the inverted position. This is obtained through the medium of a chute which has a contour in relation to the end of the conveyor travel.

29. A means for the receiving of the completed pretzels right side up as they come from the inverting chute, a conveyor running at right angles to the length of the machine, which carries the pretzels to any desired location, ready for the dipping, the salting and the baking.

30. A means for the operation of all the moving parts on each unit is provided in the form of arms with rolls attached, extending downward under the bottom of the units. The rolls on these arms come in contact with the enclosed plate cams which lie parallel to the length of the machine, producing positive operations as the units travel, attached to the endless chains, on parallel endless tracks.

31. A means for the ready assembling of additional units to the chains, and sections to the base of the machine, permitting ready increase of production.

In the drawings wherein we have shown one form of our invention for purposes of illustration;

Figure 1 is a view of a strip or rod of dough; Figure 2 is a view of the dough when bent on the initial operation of our machine; Figure 3 is a view of the dough with the lengths parallel; Figure 4 is a view of the dough with the lengths crossed; Figure 5 is a view of the dough as it appears after the twisting operation; Figure 6 is as it appears when folded to the form of a complete pretzel, but up-side-down; Figure 7 is a view of the pretzel form right-side-up with the ends pinned; Figure 1D is the chain connection;—

Figure 1A shows the rod or strip of dough about to be stripped off the retaining shelf at the bottom of the hopper on the rear of the machine; Figure 2A shows the position of the dough in the bending trough on the unit after the initial bending operation when the bending trough is in the upright or neutral position; Figure 2B shows the dough in position on the unit after ejection from the bending trough; Figure 3A shows the position of the dough on our machine when its lengths are parallel; Figure 4A shows the dough in position on our machine with the lengths crossed; Figure 5A shows the dough form as it appears and is positioned on our machine after the twisting operation; Figure 6A is a view of the dough on our machine after the pretzel form has been completed after the folding operation;

Figure 8A is an assembly side view of our machine (rear or receiving section) showing the units in the process of performing their major operations as they proceed; Figure 8B is a view of the middle section, with its units; Figure 8C is a view of the forward or delivering section of our machine showing the units performing their operations. These three views are to be read together for the entire machine of eighteen units; and some parts are omitted to clarify the construction of the parts shown;

Figure 9 is a perspective view of the dough trough and floor utilized in the bending or initial operation; parts are broken away, and one section only is shown; Figure 9A is a detail view of one of the plates and springs;

Figure 10 is a fragmentary perspective view, partly broken away showing the floor plate about to eject (ejecting position) at the termination of the initial or bending operation; the dough having the shape shown in Figures 2A and 2B;

Figure 11 is a rear end view of the machine (receiving end) showing the cams, the plate with the fingers for stripping the rod or strip from the retaining shelf; parts are in section and parts are omitted to clarify the disclosure of the parts shown;

Figure 12 is a front (delivering) end view of the machine, showing the lateral conveyor; some parts are omitted, and some are in section to facilitate identification of the parts shown;

Figure 13 is a top view of the machine with all of the fabricating units removed so that the cams can be seen in their relationship to the frame of the machine; the middle section parts are eliminated;

Figure 14 is a side view of a unit, showing its relationship to some of the cam elements, and also showing how the cams are assembled;

Figure 15A is a top plan view of a unit (left hand side only) with parts removed to facilitate identification of shown parts; Figure 15B is a top plan view of the right hand side only of a unit. Figures 15A and 15B should be read together for disclosures of the complete top plan of a unit;

Figures 16A is an enlarged fully illustrative view, side elevation, right side, receiving or rear end, of a unit; some parts being omitted to facilitate disclosure of the shown parts; Figure 16B is a companion view of the forward section; views 16A and 16B should be read together for the full unit;

Figure 17 is an enlarged rear end view of a unit, with some parts omitted, but showing the operating parts for the trough and floor; this view should be read in conjunction with Figures 9, 9A and 10;

Figure 18 is an enlarged front end view of a unit with some parts omitted, but showing particularly the cooperation and position of the cams and cam arms;

Figure 19 is a view of the left dough carrier; Figure 19A is an end view of the same; Figure 19B is a view of the right dough carrier; Figure 19C is an end view of the same;

Figure 20 is a view of the left clutch assembly for operating the parts of our machine used to complete the folding operation shown in Figure 6a; Figure 20A is a view of the right clutch;

Figure 21 is an enlarged view of the right side of a unit with parts omitted to disclose the mechanism for operating the guides and dough pinning mechanism;

Figure 22 is an enlarged rear view of a section of a unit showing the mechanism forming the track, and the like, which carry out the operation of making the twist disclosed in Figures 5 and 5A; parts are eliminated to make the parts disclosed clearer;

Figure 23 is an enlarged front view of the parts assembled on the twisting shaft; Figure 23A is a view of the latch mechanism used therewith; Figure 23B is a section taken longitudinally through the latch mechanism;

Figure 24A is a skeleton diagrammatic view of the operative motivating parts in the initial or bending operation shown in Figure 2; Figure 24B is a skeleton diagrammatic view of the operative motivating parts in the movement preparatory to completion of the twisting movement; Figure 24C is a skeleton diagrammatic view of the operative motivating parts in (1) the second movement of crossing the dough lengths shown in Figures 3A—4A; and (2) those used to throw in the clutch and operating the twisting shaft to produce the shape shown in Figures 5 and 5A; Figure 24D is a skeleton diagrammatic view of the motivating parts used to produce the fold (complete pretzel shape) shown in Figures 6 and 6A, and Figure 25 is a view showing an arrangement of a single unit machine (as distinguished from a multi-unit machine) in conjunction with a dough rolling machine.

Similar reference characters are used to designate like or similar parts throughout the several views of the drawings, and to impart an understanding of our invention to one skilled in the art; the following is descriptive of the construction of our invention throughout its complete operation, like marks of reference corresponding to the marks on the accompanying drawings:

A suitable base is provided with several castings assembled to form a sectional machine. The purpose of a sectional machine is to provide a simple method of changing the size. This is a desirable feature as the machine can have the number of units increased or decreased without discarding the machine for a larger or a smaller size.

Referring to Figure 13, the base is composed of the two rear, side castings 1 and 2; the two front side castings 3 and 4; the ten center, side castings 5. The smallest machine of this design would not have the center, side castings 5. The rear side castings and the front side castings would come together and form a complete right and left side of a machine, having eight units. Since the center side castings 5 would be added in pairs, that is, right and left, then every section of the base or the two center side castings 5 added, would necessitate the adding of two units to complete the endless chains. There is no limit to the lengths to which this machine can be built and operated.

The base of the machine is held together with the cross supporting castings, one rear top 6, two end bottom 7, and one front top 8. For every section added to the machine there are one center top casting 9, and one center bottom casting 10, used. The smallest machine, having no sections, uses one center bottom casting 10. The machine shown on the drawings uses six center bottom support castings 10. The base is assembled with the screws 11.

Assembled to the inside of the base side castings 1, 2, 3, 4 and 5, are the two sectional grooved parallel tracks 12 and 13. The top and bottom sections of each track are connected at both ends with semi-circular sections, thus forming endless tracks. The various sections of the tracks are held fast with the screws 14. When the machine size is changed by removing or adding the sections, sections of the tracks are removed or added also. The grooves in the inner sides of the tracks provide runways for the wheels on the units, which will be explained later.

Journaled in bearings in the base rear side castings 1 and 2, is a sprocket shaft 15. Mounted and keyed on the sprocket shaft 15 are the two sprockets 16. Journaled in bearings in the base front side castings 3 and 4 is a sprocket drive shaft 17. Mounted and keyed on the sprocket drive shaft 17 are the two driving sprockets 18. These sprockets are spaced a suitable distance on their respective shafts, as shown in Figures 11 and 12.

Running parallel to each track, over the sprockets 16 and 18, are the two endless roller chains 19, as shown in Figure 10. At intervals equal to the length of a unit along the entire length of the chains 19 are suitable unit connecting links 20. Each unit is connected in this manner to the chains, as will be explained later.

The sprocket drive shaft 17 is the main drive shaft for all of the movements on the machine. It continues through the bearing in the left front base side casting 4, and extends beyond a suitable distance for the mounting of a pulley, sprocket or gear, as shown in Figure 12. The ideal method for furnishing power to this machine is by a sprocket and chain drive from the pretzel rolling machine. This will produce perfect timing between the rolling and this machine. The next suitable method would be through the medium of a variable speed transmission, driven by a motor or other suitable means, thereby approximating perfect timing in relation to the rolling machine. Any suitable means of power can be used where the rolling machine is run with a variable speed transmission.

As an integral part of the top of the machine support castings 6, 8 and 9, there are pads of sufficient proportions to permit the imbedding of all of the cam plates used in the operation of the movements on each unit, as shown in Figures 10 and 11. These pads are slotted a width equal to the thickness of a cam plate, and a depth suitable for the erect standing of the cam plates parallel with the tracks of the machine, retaining the cam plates on edge, and in the correct position by the two screws 21, through the ends of the pads crosswise.

Figure 11, reading from left to right, we have the fifteen cams, 22, 23, 24, 25, 26, 27, 28, 29, 30, 31, 32, 33, 34, 35 and 36, provided by the fifteen cam plates.

Two of the fifteen cams, 25 and 26, are practically in alignment, but do not interfere with each other's operation, as their positions of operation are at two different locations longitudinal on the machine.

All cams are of similar construction and are cut in the sides of the cam plates a suitable side depth to permit the entrance of cam rolls, as shown in Figure 14. Cam rolls are attached to operating arms which pass between the various cam plates, and are the medium for the movements of the individual mechanisms on the units through the travel of the rolls over the lineal contours of the cams, which are irregular up and down suitable heights and depths to insure the proper movements on the units, which will be explained later.

Embodied in the front top machine support casting 8, we have constructed a conveyor for the receiving of the finished pretzels. A clearance is provided at a suitable place in the center for the admittance of the same. At each side of this clearance, bearings are provided at suitable distance apart, lengthwise of the machine. Journaled in bearings at the rear of the clearance is a conveyor shaft 37 extended across, and at the front of the clearance is a conveyor drive shaft 38, extended across. Keyed to the conveyor shafts 37 and 38 are the conveyor pulleys 39. Running over and between the two conveyor pulleys 39 is an endless belt 40, of a suitable material, the use of which will be explained later. A conveyor drive shaft 38 extends through the right front bearing and beyond a suitable distance to admit the mounting and keying of a sprocket 41. This sprocket 41 is driven with a chain, to be further mentioned in a later paragraph.

At the rear of the clearance, in the support casting 8, is mounted an inverting chute 42, which has a contour similar to the end of the conveyor mentioned in the above paragraph. It is mounted a suitable distance rearward to permit the passage of the completed pretzels between the inverting chute 42, and the rear end of the conveyor. The inverting chute is mounted with the screws 43.

Attached to suitable pads on the outer sides of each of the two front side castings 3 and 4, with the screws 44, are the bearing brackets 45 right and 46 left. Journaled in bearings in the left bearing bracket 46 is a conveyor shaft 47, and mounted on the conveyor shaft 47 is a conveyor pulley 48. Also journaled in bearings in the left bearing bracket 46 is an idler shaft 49, and mounted on the idler shaft 49 is an idler pulley 50. Journaled in bearings in the right bearing bracket 45 is a conveyor drive shaft 51, and mounted on the conveyor drive shaft 51 is a conveyor pulley 48. Also journaled in bearings in the right bearing bracket 45 is an idler pulley 50. Running over and between the two conveyor pulleys 48 is an endless belt 52, of a suitable material, the use of which will be explained later. Since this belt runs through the machine from the one side to the other a minimum space is necessary through the use of the idler pulleys 50, they being so positioned as to cause the lower section of the belt to run over the idler pulleys at a height in close proximity to the level of the top section of the belt. The conveyor drive shaft 51 extends through the front bearing of the right bearing bracket 45, and beyond a suitable distance to admit the mounting and keying of a sprocket 53. Extended on the outer side of the right front side casting 3 are the two bearings 3A. Journaled in these bearings 3A is a shaft 54. Mounted and keyed to the shaft 54 is a bevel gear 55, and a sprocket 56. Journaled in a bearing in the side of the right front side casting 3, and in proper relation to the bevel gear 55, is a shaft 57. Mounted and keyed on the outside end of the shaft 57 is a bevel gear 58, which meshes with the bevel gear 55, and on the inside end a sprocket 59. Running over and between the sprockets 53 and 56 is an endless roller chain 60. Mounted and keyed on the front unit drive sprocket shaft 17, in a location which is in alignment with the sprockets 41 and 59, is a sprocket 61. Running over and between the sprockets 59 and 61 is an endless roller chain 62, which is utilized in the driving of both of the conveyors as the bottom of the sprocket 41 is meshed with the top section of the roller chain 62, as shown in Figure 12.

Mounted on the outer sides of the top sections of the two tracks 12 and 13, with the screws 63, and at the rear end of the machine, is a dough receiving hopper supported by the two uprights 64 and 65. The top piece 66 of the hopper acts as a guide in deflecting each strip or rod of dough to its proper location in readiness for the selecting by the individual units. The bottom 67 of the hopper, aside from supporting each strip or rod of dough as it is received, also acts as a supporting shelf while each strip or rod of dough is in waiting to be selected by the individual units. A number of equally spaced clearance slots are provided in the shelf section, and a suitable distance up from the shelf, to permit the selection of each strip or rod of dough, as explained later. The top 66 and the bottom 67 are mounted to the uprights 64 and 65 with the screws 68. A rod 304 is a rigid tie piece for the uprights 64 and 65, and is retained by the screws 69. Journaled at each end, in bearings, in a protruding section at the top, and to the front of each of the uprights 64 and 65, is a shaft 70. Assembled in the shaft 70 is a dough deflector and guard 71. The deflector 71 has a number of clearance slots up from the bottom which coincide in alignment with the clearance slots in the hopper bottom 67. Tensioned between a spring stud 72 on the hopper top 66 and a spring clip 73 on the deflector shaft 70, is an equalizing spring 74, which retains the deflector 71 in a guarding position. It also permits the deflector 71 to move forward as each strip or rod of dough is selected and deflected downward, and returns the deflector to its guarding position, with a shockless return.

Having fully explained the assembly, and the construction of the machine base, and its component parts, we now explain the units.

Since each and every unit is an exact duplicate of the other, the description of one will suffice for all. The like marks of reference will be found principally on Figures 15, 16, 17, 18, 19, 20, 21, 22, 23 and 24. Writing of front, rear, right and left positions on the unit correspond with front, rear, right and left of the machine.

A unit is composed of a number of the various shaped and formed parts assembled on a casting 75. This unit is practically a machine in itself, performing all of the operations necessary to make completed pretzel. The projecting bearings, bosses, supports and pads, provide places for the assembling of the various parts necessary for the different movements on the unit. In defining the construction and the assembly of the parts on the unit, each movement assembly group will follow in its proper sequence of operation as nearly as possible.

At the base of the unit casting 75 along each side, located suitably, are the two bosses 75A on which are mounted the ball bearing wheels 76 attached with the screws 77. These wheels running in the grooves in the inner sides of the machine tracks 12 and 13 provide the means of travel for the units in their sequence of operations. The extensions 75B on the bottom, along each side of the unit casting 75, are slotted projections which provide connecting points between the unit and the unit connecting roller chain links 20, by connecting pins 78. The slots in the projections provide for variations in the relation of the unit casting 75 and the unit drive chains 19, when traveling around the semi-circular end sections of the tracks.

As we continue in the explanation of the movement assemblies on the unit, it shall be understood that all of the parts, as the drawings portray them, except Figure 10, are in the neutral or the non-operating positions.

Along the rear end of the unit casting 75 are the two upright projections 75C, on the front of which is mounted a selecting plate 79, held fast with the screws 80. Spaced equally across the top edge, and of a suitable height, are projections, part of plate 79. These projections coincide in alignment with the clearance slots in the shelf and the bottom section of the hopper bottom piece 67. This provision admits the projections passing through the clearance spaces, selecting each strip or rod of dough from the shelf. The plate 79 also acts as a guide for each strip or rod of dough, while in the act of dropping, after it is selected.

The following group assembly is the bending movement. At positions near the rear of the unit casting 75, one on each side, are the projecting supports 75D. Assembled along the inner side of each of the supports 75D, and rotating on the shoulder screws 81, are the mounting pieces 82 right and 83 left. Also rotating on the same shoulder screws 81, and along the inner sides of the pieces 82 and 83, are the pinions 84. Mounted about central on the inner sides of the pieces 82 and 83, with the shoulder screws 85, to permit rotation, are the small gear segments 86. A brace 87, of a suitable length and form, is mounted at the extreme ends, between, and to the mounting pieces 82 and 83, with the two screws 88 at each end. At both ends of the brace 87 is formed an ear at an angle of 45 degrees to the brace length, which provides a mounting to the dough bending piece 89, with the two screws 90 at each ear. Indirectly, this produces practically a solid connection of mounting pieces 82 and 83, brace 87, and the dough bending piece 89, the necessity for which will be explained later. The bent dough receiving trough 91, in the position shown in Figures 15 and 16, has a bottom, a front side and a rear side, and in Figure 17 is shown to have a formed lineal contour, in likeness to the bending piece 89. As can be seen in Figure 17, there is an ear 91A along the bottom edge of the straight section on each side. These ears 91A are formed from material of the bottom of the trough 91. This forming leaves an aperture in the bottom of each side suitable for the admission of the ends of the brace 87 to mount on the bending piece 89. This permits the bending piece 89 to lay on the bottom, inside of the trough 91. In Figure 17 is shown floating members 92 on the right, and 93 on the left. Each of these members 92 and 93 have an ear formed over towards the center of the unit, and in direct alignment with the ears 91A along the bottom of the straight sections of the trough 91. From the ear on the member 92, at the right, to the ear on the member 93 at the left, is a trough brace 94. There are the two mounting screws 95 at each side, which go through the trough ears 91A, the trough brace 94, and screw into the ears on the floating members 91 and 92. Indirectly, this produces a single floating piece of trough 91, brace 94, and the members 92 and 93. This floating assembly is kept in the proper location through the two guide pins 96 riveted onto the members 92 and 93, extending through and guiding in the slots 82A and 83A in the mounting pieces 82 and 83. Another guide pin 97 is provided by riveting a pin 97 in the bent section of the bending piece 89, the pin extending through a hole in the bottom of the trough 91. Since the small gear segments 86 are mounted on the inner sides of the mounting pieces 82 and 83, their slotted ends extend far enough to engage with the two guide pins 96. Tensioned between the spring studs 98, mounted on the floating members 92 and 93, and the spring studs 99 mounted on the brace 87, are the two springs 100. Because of the two indirect solid piece assemblies heretofore mentioned, the bending piece 89 is kept in and against the bottom of the trough 91, under spring tensions provided by the springs 100. On each side of the unit and in alignment with the pinions 84, at suitable places on the pads along the inner sides of the upward projecting bearing supports 75E, is mounted gear segments 101, which rotate on shoulder screws 102. The rear ends of the gear segments 101 are in mesh with the pinions 84. On the shoulder screws 102, between the gear segments 101 and the pads along the inner sides of the bearings 75E, are spacing collars 103. The spacing collars 103 provide a place between the gear segments 101 and the pads on the bearing supports 75E for the insertion of levers 104 on the right side of the unit and 105 on the left side of the unit. One end of each of the levers 104 and 105 is assembled rigidly in their respective locations with the pins 106 to a shaft 107, which extends across from the one side to the other, and is journaled at both ends in suitable bearings located in the lower part of the projecting bearing supports 75E. The other ends of the levers 104 and 105 are provided with connecting places for the gear segments 101 through the means of shoulder screws 108, which are tight in the levers 104 and 105 and loose over the shoulders in slots in the sectors 101. Since the levers 104 and 105 are fastened rigidly to the shaft 107, any movement of the shaft 107 will move the connecting parts of the levers 104 and 105 simultaneously. At a suitable place on the inner side of the lever 104 is connected with a shoulder screw 109, a cam arm 110, which extends downward perpendicularly through an aperture in the unit casting 75, and is held in proper location by a shoulder screw 111 screwed into the downward projecting support 75F on the bottom of the unit casting 75, through a slot in the cam arm 110. Along the rear edge of the cam arm 110 is a roll 112, which rotates on a shoulder mounting screw 113, screwed into the support 75F. The roll 112 acts as a thrust roll to eliminate friction on the cam arm 110 when receiving a back pressure while operating on a cam. At the extreme bottom of the cam arm 110 is a roller 114, which rotates on a shoulder rivet 115 when following a cam. There are stop pins 116 riveted to the inner sides of the two mounting supports 75D, the purpose of which will be explained later.

At the rear of the unit, and on both sides in alignment with the ends of the trough 91, are knives 117, which are mounted erect with the screws 118 screwed into the top of unit casting 75.

The following descriptions constitute the assembly of the right and left cross movement parts. Near the rear of unit casting 75 on either side are the two upward projecting bearing supports 75G on the right, and 75H on the left. The hubs of the bevel gears 119 are journaled in bearings at the top front sections of 75G and 75H. These bevel gears 119, having square holes, are joined to shafts 120, which are square on the one end, while the other end is journaled in bearings at the top rear sections of 75G and 75H. The square ends of the shafts 120 extend a suitable distance through and beyond the bevel gears 119 to permit mounting the brackets 121 and 122, held fast with screws 123. Mounted to the extreme ends of the brackets 121 and 122 are the troughs 124 and 125, with the rivets 126; the right trough 124 to the right bracket 121, and the left trough 125 to the left bracket 122. The purpose of these troughs is for the receiving and the conveying of each strip or rod of dough, which will be described later. The shafts which are a direct part of the spur gears 127 are journaled in bearings at the top outer sections of 75G and 75H. These shafts of the gears 127 extend through and beyond the inner sides of the bearings a suitable distance for mounting of the bevel gears 128, which mesh with the bevel gears 119, and are held fast to the shafts of the gears 127 by the screws 129. Along the outer sides of 75G and 75H gear segments 130 on the right, and 131 on the left, rotate on shoulder screws 132. The upper ends of the gear segments 130 and 131 mesh with the spur gears 127. On extended sections at the bottoms of the gear segments 130 and 131 are connected cam arm 133 to 130, and 134 to 131, with shoulder screws 135. The cam arm 133 extends downward perpendicularly through an aperture in the unit casting 75, and is held in proper location by a shoulder screw 111 screwed into a downward projecting support 75I on the bottom of the unit casting 75, through a slot in the cam arm 133. Along the rear edge of the cam arm 133 is a roll 112, which rotates on a shoulder mounting screw 113 screwed into the support 75I. At the extreme bottom of the cam arm 133 is a roller 114, which rotates on a shoulder rivet 115. The cam arm 134 extends downward perpendicularly through an aperture in the unit casting 75, and is held in proper location by a shoulder screw 111, screwed into the downward projecting support 75J on the bottom of the unit casting 75, through a slot in the cam arm 134. Along the rear edge of the cam arm 134 is a roll 112, which rotates on a shoulder mounting screw 113 screwed into the support 75J. At the extreme bottom of the cam arm 134 is a roller 114 which rotates on a shoulder rivet 115. The right and the left cross movements, although similar in construction, are entirely independent of each other, and are operated off different cams.

The following description constitutes the assembly of the twisting movement with reference principally to Figures 15, 16, 18, 21 and 22. Extending upward near the center of the unit casting 75 is a large bearing support 75K, which houses a ball bearing 136 designed to support the end thrust either direction, as well as the lateral. The bearing 136 is inserted in a counterbore from the front side of the support 75K. The outer ring of the bearing 136 is clamped fast between the rear end of the counterbore and the housing cap 137 by the screws 138. Incorporated in the cap 137 is a self-oiling wick 139. Slightly to the right and in front of the support 75K, is located a bearing support 75L, having a bearing 140 attached to the left side by the screws 141. With a section extending rearward beyond the bearing support 75K, the twister shaft 142 fits snug in the inner ring of the ball bearing 136, journalizing itself with the ball bearing 136. The shaft 142 is also journaled at the rear end in the bearing 140. The shaft 142, just in front of the bearing 136, has a shoulder for locating purposes, then for a suitable distance the shaft is square to permit mounting with a sliding fit a squared holed male clutch piece 143, next to the square portion on the shaft is mounted a combination female clutch and bevel gear 144, which rotates on the shaft, and is held in location by a spacing collar 145. In a bearing near the top of the bearing support 75L is journaled a shaft which is part of a spur gear 146 along the right side thereof. The gear shaft 146 has a square shoulder and a threaded portion extending through to the left beyond the support 75L, a distance sufficient for the mounting of a bevel gear 147, which meshes with the bevel gear 144, and is held in place with a hex nut 148 screwed on the end of the shaft 146. The gear segment 149, along the right side of the support 75L, and in mesh with the spur gear 146, rotates on a shoulder screw 150, which is screwed fast to the support 75L. At a suitable point on the right side of the gear segment 149 is connected with a shoulder screw 178 a cam arm 177, which extends downward perpendicularly through an aperture in the unit casting 75, and is held in proper location by a shoulder screw 111, screwed into the downward projecting support 75P on the bottom of the unit casting 75, through a slot in the cam arm 177. Along the rear edge of the cam arm 177 is a roll 112, which rotates on a shoulder mounting screw 113 screwed into the support 75P. At the extreme bottom of the cam arm 177 is a roller 114, which rotates on a shoulder rivet 115. The male clutch piece 143 is encircled with a groove for the admittance of a roll 151, which rotates on a stud 152 riveted to the right side of a clutch throw lever 153. The clutch throw lever 153 rotates on a shoulder screw 154, which is screwed fast to the left side of an upward projecting support 75M. At a suitable place on the left side of the clutch throw lever 153 is connected with a shoulder screw 180 a cam arm 179, which extends downward perpendicularly through an aperture in the unit casting 75, and is held in proper location by a shoulder screw 111 screwed into the downward projecting support 75Q on the bottom of the unit casting 75, through a slot in the cam arm 179. Along the rear edge of the cam arm 179 is a roll 112, which rotates on a shoulder mounting screw 113 screwed into the support 75Q. At the extreme bottom of the cam arm 179 is a roller 114, which rotates on a shoulder rivet 115. The twister shaft 142 extends rearward through and beyond the bearing mounting 75K a distance suitable for the mounting of a hinge block 155 with the pins 156. Assembled astride the extreme rear end of the hinge block 155 are the two support brackets 157 and 158, which rotate on the shoulder screws 159. At the point of mounting the bracket 157 overlaps the bracket 158. Attached to each on the front side of the bracket 158 and the bottom side of the bracket 157, about central with rivets 160, are formed connecting pieces 161. Connected to the pieces 161 with shoulder rivets 162 are connecting links 163. Assembled adjacent to and in front of the brackets 157 and 158 astride the hinge block 155 are the intermediate brackets 164 and 165, which rotate on shoulder screws 166. At the point of mounting the bracket 164 overlaps the bracket 165. Through forming, a suitable surface is provided on the extreme end of each of the brackets 164 and 165 for the assembling of ball bearing wheels 167 with shoulder rivets 168. About central of the brackets 164 and 165 are connected the rear ends of the connecting links 163 with shoulder rivets 169. Located at each side of the rear end of twister shaft assembly, extending upwards from the unit casting 75, are bearing supports 75N. Between and joining the bearing supports 75N is a web 75O with a semi-circular contour at the top. On a surface of the rear side of this web is mounted a semi-circular track 170 with the screws 171. The track 170 extends far enough above the semi-circular web 75O to permit small ears 165A, formed from each side of the bracket 165, to locate itself and travel around the front side of the track 170 when the twister shaft assembly is rotated. Journaled crosswise in a bearing at the top of each support 75N are small shafts 172 with suitable places on the inner ends for the mounting of a semi-circular track 173 with the screws 174. The tracks 170 and 173 are in alignment with each other to the extent of making a perfect circular track at a certain stage of their operation. There is a suitable clearance in front of the track 173 to permit small ears 164A, formed from each side of the bracket 164, to locate and travel around the front side of the track 173 when the twister shaft assembly is rotated. The ball bearing wheels 167 are held against the rear surfaces of the tracks 170 and 173 at all times by the ears 164A and 165A, which are always located in front of the tracks. Assembled to the outer ends of each shaft 172 are small gear segments 175 held fast to the shafts with pins 176. Journaled crosswise in the bearings at lower front positions of the two supports 75N is a shaft 181 extending from one side to the other. The shaft 181 extends through and beyond the support 75N on the right side of the unit a distance sufficient for the mounting of a gear segment 182 with the pin 183. The shaft 181 extends through and beyond the support 75N on the left side of the unit a distance sufficient for the mounting of a gear segment 184 with the pin 185, and an operating arm 186 with the pin 187. The gear segments 182 and 184 are meshed at the top with the gear segments 175. At a suitable place on the outer side of each of the gear segments 182 and 184 is connected arms 190 with shoulder screws 191. The arms 190 rotate on the folding movement shaft 192 and are located crosswise on the unit, with the shaft collars 193 held rigidly to the shaft with the pins 194. The arms 190 have attached to their uppermost ends, and extending across from one to the other, a flat plate 197 fastened with the rivets 198. This plate 197 serves the purpose of a brace for the arms, and a guard for the ends of each strip or rod of dough while twisting. At a suitable point on the left side of the operating arm 186 is connected with a shoulder screw 195 a cam arm 196 which extends downward perpendicularly through an aperture in unit casting 75, and is held in proper location by a shoulder screw 111 screwed into a downward projecting support 75R on the bottom of the unit casting 75, through a slot in the cam arm 196. Along the rear edge of the cam arm 196 is a roll 112, which rotates on a shoulder mounting screw 113 screwed into the support 75R. At the extreme bottom of the cam arm 196 is a roller 114, which rotates on a shoulder rivet 115 when following a cam.

The following description comprises the assembly of the fold movement with reference principally to Figures 15, 16, 18, 20, 21 and 22. On each side of the unit, as previously described, there are upward projecting bearing supports 75E. A suitable distance outward and in alignment with the supports 75E, on each side of the unit, are located the projecting bearing supports 75S. Journaled in the top bearings of the supports 75S on each side of the unit are the hubs of spur gears 199. The hubs of the gears 199 extend beyond the outer sides of the supports 75S a distance sufficient for the incorporation of female clutches 199A in the ends, and threaded sections suitable for screwing thrust collars 200 against shoulders. This construction will permit the gears to rotate, but still prevent thrust movements. The shafts 201 are each journaled at one end in bearings at the top of supports 75E, while the other end of each is a sliding fit in the bores of the gears 199. Pins 202 in the outer ends of the shafts 201 act as male clutch members when in operation. Assembled in slots on the inner ends of shafts 201, with screws 203, are engagement pieces 204, the purpose of which will be explained later. At a suitable position on each shaft 201, between the bearing supports 75E and 75S, are mounted grooved collars 205, held rigid to the shafts with pins 206. Located in front of the supports 75S are the bearing supports 75T. Journaled at each end, in a bearing in each support 75T, is a shaft 192. Assembled on the shaft 192, along the inner sides of the supports 75T, and in alignment with the spur gears 199, are gear segments 207 on the right side of the unit, and 208 on the left side of the unit, held rigid to the shaft 192 with pins 209. A movement of the shaft 192 will produce uniform movements of the gear segments 207 and 208, which are meshed with the spur gears 199. At a suitable place on the inner side of the gear segment 207 is connected with a screw 210 a cam arm 211, which extends downward perpendicularly through an aperture in the unit casting 75, and is held in proper location by a shoulder screw 111 screwed into the downward projecting support 75U on the bottom of the unit casting 75, through a slot in the cam arm 211. Along the rear edge of the cam arm 211 is a roll 112, which rotates on a shoulder mounting screw 113 screwed into the support 75U. At the extreme bottom of the cam arm 211 is a roller 114, which rotates on a shoulder rivet 115 when following a cam. Engaged in a groove of each collar 205 is a roller 212, which rotates on studs 213 riveted to the upper ends of the engagement levers 214. The lower ends of the levers 214 are permitted to rotate on the shoulders of screws 215, which screw into the bosses 75V located one on each side of the top of the unit casting 75. At a position near the center of the lower sides of each lever 214 are riveted studs 216 on which rotate rollers 217. At lower rear positions of the supports 75E and 75S, on each side of the unit, are located bearings which are in alignment. A shaft 218 is journaled in the four bearings in the supports 75E and 75S crosswise on the unit, and the center of the shaft 218 passes through a tubular shaft 219, the use of which will be explained later, without coming in contact with it. Assembled rigidly on the shaft 218 with pins 220 at a position on each side of the unit, between the supports 75E and 75S are segments 221 in which are incorporated spiral cams. The segment 221 on the right side of unit is a left spiral cam, while the one on the left side of the unit is a right spiral cam. Engaged in the groove of each of these cams 221 are rollers 217, and when the shaft 218 is rotated, the engagement levers 214 are moved toward or away from each other. Attached rigidly to the shaft 218, along the inner side of the left support 75S, with a pin 222 is an operating lever 223. At a suitable place on the outer side of the lever 223 is connected, with a screw 224, a cam arm 225, which extends downward perpendicularly through an aperture in the unit casting 75, and is held in proper location by a shoulder screw 111 screwed into the downward projecting support 75W on the bottom of the unit casting 75, through a slot in the cam arm 225. Along the rear edge of the cam arm 225, is a roll 112, which rotates on a shoulder mounting screw 113 screwed into the support 75W. At the extreme bottom of the cam arm 225 is a roller 114 which rotates on a shoulder rivet 115 when following a cam. Referring to the fold shafts engagement pieces 204, each is retained at a neutral level by a supporting piece 226 which is mounted on the top of the unit casting 75 with the screws 227. The top of each piece 204 and the top of each extended arm of support bracket 157 are on the same level. Attached to each support bracket 157 and 158 is a plate with a number of parts thereon assembled. These plates being duplicates of each other, a description of one will suffice for both, therefore, this description will cover the plate as in the position attached to the support bracket 157. At the rear end of the plate 228 there is a section formed downward to which is attached a bottom plate 229 with the rivets 230. Near the center of the piece 229 and between the plates 228 and 229 is a supporting post 231, which is riveted to the bottom of the plate 228 and the top of the plate 229. These parts, constructed and assembled as they are, provide a suitable frame for the assembling and the operating of the parts thereto attached. Inserted with a sliding fit in the three apertures in the top plate 228 are the guides, left 232, right 233, and front center 234. The curved contour of these guides is a likeness to the inside shape of the rim of the pretzel. The clearance provided between the straight sides of the guides are for the twist and the ends of the pretzel when making the fold. The center guide 234 has attached rigidly to the bottom a rearward extension piece 235, which is held in place with the three screws 236. A shoulder screw 237 is a sliding fit in the bottom plate 229, and is screwed into the bottom of the piece 235, permitting the guide 234 to slide up and down when desired. Since the up position of the guides is neutral, an expanding coil spring 238 is inserted over the shoulder of the screw 237, between the plate 229 and the piece 235, thus forcing the guide 234 upward until the underneath surface of the head on the screw 237 stops against the bottom of the bottom plate 229. The shoulder screws 239 are sliding fits in the bottom plate 229 and are screwed one each into the bottom of guides 232 and 233, permitting the guides to slide up and down when desired. An expanding coil spring 240 is inserted over each shoulder screw 239, between the plate 229 and the bottom of the guides 232 and 233, thus forcing the guides 232 and 233 upward until the underneath surface of the head on the screws 239 stop against the bottom of the bottom plate 229. The support plates 228 are located on the support brackets 157 and 158 through the means of the two guide pins 241 attached to the plates 228, and locating in the two holes in each of the support brackets 157 and 158. Assembled on the bottom, along each side of the plates 228, are a group of parts which permit the attachment of the plates 228 to the support brackets 157 and 158 during all operations except the fold, in which case they are released from the supports 157 and 158 and attached to the engagement pieces 204 to permit the carrying of the dough while folding. This group of parts on each side of the plates 228 consists of the two pawls 242 which rotate each on a shoulder rivet 244; a single flat spring 243 assembled between and under the heads of the rivets 244, tensioned against the pawls 242 with a locking provision for the pawls 242, which will be explained later. Figure 23 shows one of the plates 228 attached to the support bracket 158 while the other plate is shown attached to the engagement pieces 204. A stud 245, attached to each side of the plate 228, provides a guiding and a locating means for slots in the engagement pieces 204. As shown in Figure 24, the flat spring 243, extending from the one mounting rivet 244, to the other, has three spherical protrusions. The two protrusions farthest apart provide a locking means for the pawls 242, when the plates 228 are attached to the brackets 157 and 158. The center protrusion, being slightly larger, acts as a cam through the interference of the engagement pieces 204 between the center protrusion and the plates 228, thereby forcing the spring away from the pawls, removing the smaller protrusions from an indenture in the ends of pawls, affording a lock release. As the locks on the pawls are released, the pieces 204 continue their movement while the contour of their engaging ends in contact with the pawl ends produces a rotating movement of the pawls 242, disengaging their outer ends from small apertures in the sides of the brackets 157 and 158. The plate 228 is now locked to the engagement pieces 204. A reversal of these movements results in the plates 228 being locked to the brackets 157 and 158.

Directly under the guide screws 237 and 239, in a bearing 75X on the unit casting 75, is a perpendicular sliding cam arm 246, which extends through to the bottom side of the unit casting 75. At the extreme bottom of the cam arm 246 is a roller 114, which rotates on a shoulder rivet 115 when following a cam. At the extreme top of the cam arm 246 are two formed ears to which is attached a plate 247 with the rivets 248. The plate 247 is large enough to come in contact with the heads of the guide screws 237 and 239 when moved upward. Riveted to the bottom left side of the plate 247 is a spring guiding pin 249. Inserted in a bottomless hole, to the left of the cam arm 246, in the bearing 75X, and over the pin 249, is an expanding coil spring 250, exerting a pressure against the bottom of the plate 247, holding it in a raised or the neutral position.

The following description explains the construction of the work table and its component parts, also the unloading mechanism. Referring to the tubular shaft 219, heretofore mentioned, which is journaled in a bearing at each end, located in a lower front position of bearing supports 75Y, which project upward from the top of the unit casting 75, there is a slot across each end of the shaft 219 for the admittance of two tongued keys which are a part of each of the operating levers 251 right and 252 left. Each of these levers 251 and 252 has a hole suitable for the insertion of the slotted ends of the shaft 219, thus producing simultaneous operation of the levers when rotating the shaft. As mentioned heretofore, the shaft 218 passes through the tubular shaft 219. Mounted on the shaft 218, adjacent to the ends of the shaft 219, are collars 253, held tight with pins 254. These collars 253 retain the operating levers 251 and 252 on the shaft 219, and keep the shaft 219 in its proper location crosswise on the unit. This assembly of the levers 251 and 252 locates them along the outer sides of the bearing supports 75Y. The uppermost ends of the levers 251 and 252 are connected with shoulder screws 256 to locking levers 255, permitting rotation. Mounted on the shoulders of the screws 256, between the levers 251 and 255, also between 252 and 255, are collars 257, having a thickness equal to the thickness of the bearing supports 75Y. This places the locking levers 255 along the inner side of each bearing support 75Y, where they rotate on an extended end of screws 258 inserted from the outside of the bearing supports 75Y, extending through and beyond the inner sides sufficient for the purpose. Rotating on shoulder rivets 259, attached to the inner sides of the levers 255, are rollers 260. The levers 255 are retained on their pivoting points which are the extending ends of the screws 258 by the assembly of a work table 261 between them. The work table 261 has a flat top on a level with the bent dough support plate 228, a side plate formed downward on the right and the left sides, and a rearward extending chute of a shape suitable for the unloading of the finished pretzels. Attached rigidly to each of the inner sides of the downward formed side plates of the work table 261, with the rivets 262, are bearings 263. These bearings 263 permit the journaling and the rotating of the work table 261 and its component parts on the tubular shaft 219, while the slot portion of the bearings 263 permit the engagement of the rollers 260. When the rollers 260 are moved downward in the slots, the work table 261 and its component parts tilt rearward, and when in the position as shown in Figure 16, the work table is locked against any force or movement of itself. The means for movement of the unloading levers 251, 252 and 255 with the rollers 260 is a cam arm 302, which is connected at a suitable place to the outside of the left unloading operating lever 252 with a shoulder screw 303. The cam arm 302 extends downward perpendicularly through an aperture in the unit casting 75, and is held in proper location by a shoulder screw 111 screwed into the downward projecting support 75Z on the bottom of the unit casting 75, through a slot in the cam arm 302. Along the rear edge of the cam arm 302 is a roll 112, which rotates on a shoulder mounting screw 113 screwed into the support 75Z. At the extreme bottom of the cam arm 302 is a roller 114 which rotates on a shoulder rivet 115 when following a cam. Embodied in the work table 261 are a number of different parts which operate at various intervals in conjunction with the different operations of the unit. Under the top of the work table 261, at suitable heights and between the work table side plates, is an upper brace block 264, and a lower brace block 265 to which the work table side plates are attached rigidly with the flat head screws 266. Incorporated in the brace blocks 264 and 265 are a number of elongated vertical bearing slots which act as guiding slides for a number of the vertical cam arms, which operate up and down at desired intervals. The central front top piece 267 in the work table 261 is connected at the rear bottom side to the hinges 268 with rivets 269, and the hinges are connected to the bottom of the work table 261 with the rivets 269. This permits the up and down movement of the front section of the piece 267, while the rear retains its connection at the work table top level. Attached to the bottom side of the piece 267 is a ninety degree formed piece 270, with the rivets 271. The side of piece 270 is connected through a slot in said piece by a shoulder screw 272 to a cam arm 273 which is of suitable top forming. The cam arm 273 passes downward perpendicularly through the elongated slots in the blocks 264 and 265, and at the extreme bottom of the cam arm 273 is a roller 114 which rotates on a shoulder rivet 115 when following a cam. A coil spring 274 with a pull tension between a spring stud 275 attached to the bottom side of the block 264, and a spring stud 276 attached to the right side of the cam arm 273, locates the piece 267 at a level flush with the top of the work table 261 by means of a stop pin 277 attached to the left side of the cam arm 273 coming in contact with the bottom side of the block 264, which is the neutral position. Inserted in the top of the work table 261 are three guides, 278 left, 279 right, and 280 center rear, which are in direct alignment respectively with the guides 232, 233 and 234 in the support plate 228, when the plate 228 and the guides are rotated rearward, their axis being the fold shafts 201. Attached rigidly to the bottom of the left guide 278 by means of screws 282 is the top of a cam arm 281. The cam arm 281 passes downward perpendicularly through the elongated slots in the blocks 264 and 265, and at the extreme bottom of the cam arm 281 is a roller 114, which rotates on a shoulder rivet 115 when following a cam. A coil spring 283 with a pull tension between a spring stud 284 attached to the top side of the block 265 and a spring stud 285 attached to the left side of the cam arm 281, locates the guide 278 at a level flush with the top of the work table 261, the bottom of the guide 278 stopping against the top of the block 264, which is the neutral position. Attached rigidly to the bottom of the right guide 279 by means of screws 282 is the top of a cam arm 286. The cam arm 286 passes downward perpendicularly through the elongated slots in the blocks 264 and 265, and at the extreme bottom of the cam arm 286 is a roller 114, which rotates on a shoulder rivet 115 when following a cam. A coil spring 287 with a pull tension between a spring stud 288 attached to the top side of the block 265, and a spring stud 289 attached to the right side of the cam arm 286, locates the guide 279 at a level flush with the top of the work table 261, the bottom of the guide 279 stopping against the top of the block 264, which is the neutral position. Attached rigidly through a lengthwise slot in the bottom of center rear guide 280, with two dowel pins 291 inserted crosswise, is the top of a cam arm 290. The cam arm 290 passes downward perpendicularly through the elongated slots in the blocks 264 and 265, and at the extreme bottom of the cam arm 290 is a roller 114, which rotates on a shoulder rivet 115 when following a cam. A coil spring 292 with a pull tension between a spring stud 293 attached to the top side of the block 265 and a spring stud 294 attached to the right side of the cam arm 290, locates the guide 280 at a level flush with the top of the work table 261, the bottom of guide 280 stopping against the top of the block 264, which is the neutral position. In each of the two rear sections of the work table center piece 267 is an aperture 267A, which provides openings for the upward movement of the two indent pins 295 which attach erect and in alignment with the apertures 267A, to a plate 296. Attached to the plate 296 rigidly with the rivets 297 is the top of a cam arm 298. The cam arm 298 passes downward perpendicularly through the longated slots in the blocks 264 and 265, and at the extreme bottom of the cam arm 298 is a roller 114 which rotates on a shoulder rivet 115 when following a cam. A coil spring 299, with a pull tension between a spring stud 300 attached to the top side of the block 265, and a spring stud 301 attached to the right side of the cam arm 298, locates the indent pins at a position below the top of the work table 261, the bottom of the plate 296 stopping against the top of the block 264, which is the neutral position.

In the foregoing we have described the various parts making up the mechanical organization of an operating unit of our invention, and in some respects such parts have been identified with the functions which they perform; however, in order that the full operation of a unit may be thoroughly understood we have defined in the following the various stages through which a strip or rod of dough passes when operated upon by our machine. Furthermore in conjunction with Figure 25 we have shown a single-unit machine which is actuated by a suitable rotary cam mechanism, and which is set up in conjunction with a pretzel rolling machine of the type we have heretofore defined. Since with both the single and the multiple unit machines any type of conventional rolling machine may be used, one of said machines may be generally described as follows; such a machine has a hopper for receiving the dough, which subsequently goes through a kneading process and is then divided into small portions of a size approximating the amount necessary for a pretzel. The small portions drop on an endless conveyor belt running lengthwise of the machine by pulleys operating in a clockwise direction. A second conveyor belt directly above the first is operated by pulleys running in a counter-clockwise direction; the space between the two belts being equivalent to the desired diameter of a rod or strip of dough for making the pretzel so that the portion of dough passed to the first conveyor is rolled out by the second conveyor belt to the desired form and size. The second conveyor belt preferably runs at less speed than the first. The dough rod or strip is ejected from the front of the machine. While this type of machine may be used and has been found practical any other means may be substituted for producing lengths of dough rod or strips, and they may even be fed to our machine manually. In practice such a machine is used with either a single unit or a multiple unit organization of our invention. In the following we have described the course of a rod or strip of dough through all of the operations of bending, twisting and folding into a completed pretzel, and the ejecting of the same from the machine and conveying it to a location convenient for dipping, salting and baking.

However, before describing the operation in conjunction with the detailed figures of the drawings, reference is here made to Figures 2A, 2B, 3A, 4A, 5A and 6A, and Figures 24A—B—C—D, all of which are essentially diagrammatic and are designed to facilitate a ready understanding of what might be a series of rather intricate operations. Figures 2A, 2B and 24A should be read together, since Figure 24A shows cam arm 110, member 104, shaft 107, rack 101, shaft 102, and other parts essential to the operation of delivering a bent strip of dough to the work table in the position shown in Figure 2B, such as gear 84 and rack 86 engaging the pin 96 to operate the parts shown in detail in Figures 9, 9A and 10, and members 82 and 116. As will be described hereinafter these parts when actuated function to move the dough bending trough 91 into position to deposit the bent strip of dough on the machine in the position disclosed in Figure 2B with the ends thereof positioned in members 124—125 and the curved or bent intermediate portion about the guides 232, 233 and 234 of plate 228 attached to support 157. The first movement shown in Figure 24C, including cam arm 133, rack 130 and pinion 127 is designed to actuate the left and right troughs 124—125 to first move the ends of the dough substantially parallel as in Figure 3A, and then crossed as in Figure 4A with the looped portion about the guides 232, 233 and 234 on plate 228 attached to support 157, and the crossed ends between guides 278, 279 and 280 on work table 261. Figures 22 and 24B show the principal parts active in preparing the machine for the twisting movement including cam arm 196, rack 182 and rack 175, member 190, the track 173, and cooperating structure including shaft 142, the brackets 164 and 165, the links 163, and members 157 and 158. The twisting movement itself is produced through actuation of cam arms 179 and 177, the first of which is designed to throw lever 153 to shift the clutch member 143 to engage female clutch 144, and the second of which (#177) operates through rack 149 and gear 146 to rotate the shaft 142 to twist the dough body so that it will assume the position shown in Figure 5A with the crossed and twisted portion on the work table center piece 267, and the looped portion about the guides 232, 233 and 234 on plate 228 attached to support 158, the plates having been reversed due to the twisting movement. Figures 20, 20A and 24D show those parts principally responsible for the folding movement to produce a finished (but up-side-down) pretzel form as shown in Figure 6A, preparatory to reversing the pretzel through the instrumentality of the reversing chute to the position shown in Figure 7. These parts include the cam arms 211 and 225, rack segment 207, shaft 218 and member 214 with cooperating parts which will hereinafter be described. Reference will also be made in the following detailed description of operation to the perspective views of the trough and floor operating mechanism shown in Figures 9, 9A and 10 designed to initially bend a straight strip or rod of dough as it is received from the pretzel rolling machine, and deposit the same on the machine in the position shown in Figure 2B, and also Figure 21 showing the pins for adhering the crossed ends to the loop (i. e. the pins 295) and the structure for retracting the guides.

It may be stated here that our invention is especially designed to manipulate portions of a dough body in such a manner that the texture of the dough and its inherent characteristics such as cellular context and the like are not in any way changed such as would be the case if the dough were squeezed, pressed or otherwise positively and firmly grasped by some of the operating parts of the machine. To this end it is our purpose as far as possible to simply lift portions of the dough body to the various positions and deposit these portions in their desired shapes and positions without pressing, squeezing and the like; for instance the initial bend is produced by the weight of the dough itself assuming its natural position on the floor in the trough; the crossing of the ends is produced by lifting the ends to their desired positions; the shaping of the looped portion is obtained by a normal guiding action; the twisting operation produces as near as possible the same conditions as occur in manual pretzel forming, and the folding action is entirely a lifting operation. This is an important feature of our invention.

The strip or rod of dough in a horizontal position parallel to the width of the machine enters the opening provided by bottom 67, top 66, and uprights 64 and 65 of the hopper. From its own gravitation it rolls on the top inclined surface of bottom 67, guided by uprights 64 and 65, and is deflected to a suitable position on the shelf section of bottom 67 by top 66. The strip or rod of dough is now in waiting to be selected by the first unit passing under the hopper. The strip or rod of dough has the shape as shown in Figure 1. Sprockets 16 and 18 rotate clockwise driving the chains 19, which are connected by chain links 20, and pins 78, to each unit on the machine, thus causing all units to travel continuously in a clockwise motion on the endless tracks 12 and 13. The units are in active operation when they are traveling from rear to front of machine on the top straight sections of tracks 12 and 13. Each unit in a complete rotating cycle on the tracks 12 and 13 selects a strip or rod of dough and completes all operations necessary to bend, twist, fold, attach ends of dough, and eject a completed pretzel. As a unit passes between supports 64 and 65, and under shelf section of bottom 67, where the strip or rod of dough is in waiting, the projections of plate 79 on the unit passes through the clearance slots in shelf section of bottom 67 removes the strip or rod of dough. The deflector 71 guards against the strip or rod of dough being thrown away from plate 79, which might be caused from the impact of plate 79 contacting the strip or rod of dough when units are traveling at high speed.

Immediately on leaving the shelf section of bottom 67, the strip or rod of dough of its own gravitation drops into trough 91, receiving a shape from bending piece 89, as shown in Figure 2. Unit A on Figure 8A is in a position on tracks ready for the start of the various movements incorporated in a unit. The unit continuing its movement toward the front of the machine causes the engagement of cam arm 110 with cam 35, moving cam arm 119 upward, rotating levers 104 and 105 clockwise on their axis, the shaft 107. Since levers 104 and 105 are connected to gear segments 101, the segments 101 rotate counterclockwise on their axis, the screws 102. The gear segments 101 being in mesh with the pinions 84 produce a clockwise motion of pinions 84 on their axis, the screws 81. Gear segments 86 in mesh with the pinions 84, receive a counter-clockwise pressure on their axis, the screws 85. Engaged in the slotted ends of the gear segments 86 are the guide pins 96, which are indirectly a part of the trough 91. Springs 100 are tensioned against the counter-clockwise pressure of segments 86 by their attachment to the studs 98, which are indirectly a part of trough 91, and their attachment to the studs 99, which are indirectly a part of bending piece 89. Bending piece 89 indirectly is a part of the pieces 82 and 83, which rotate clockwise on their axis, the screws 81. This assembly keeps bending piece 89 in the bottom of trough 91 under spring tension while the trough 91 with its component parts carrying the strip or rod of dough is moved to a horizontal position on the unit under the same spring tensions in co-operation with the segments 86 and the pinions 84. While the strip or rod of dough is moving forward there are two knives 117 with their cutting edges in line with the arc movement of the ends of trough 91, which remove any excess length from the ends of the strip or rod of dough. This operation can be seen in Figure 8A, unit B.

As the unit continues its travel, a cam arm 246 engages with the cam 29 without either up or down movement, but as a safety for retaining the guides 232, 233 and 234 in the up position in readiness for receiving the bent section of the strip or rod of dough. The cam arm 133 engages with the cam 34. The cam arm 133 is moved upward a slight distance and by its connection with the gear segment 130 causes a clockwise rotation of the gear segment 139. The gear segment 139 in mesh with the spur gear 127 produces a counter-clockwise motion of the spur gear 127 and the bevel gear 128, the two gears being rigidly attached to each other. Looking from the rear to the front of the unit, the bevel gear 128 in mesh with the bevel gear 119 causes a counter-clockwise rotation of the bevel gear 119, the bracket 121 and the trough 124. This movement leaves the inside bottom surface of the trough 124 on a level with the work table 261 and the support plate 228, in readiness to receive the right straight end of the bent strip or rod of dough. The cam arm 134 engages with the cam 24. The cam arm 133 is moved upward a slight distance and by its connection with the gear segment 130 causes a clockwise rotation of the gear segment 139. The gear segment 130 in mesh with the spur gear 127 produces a counter-clockwise motion of the spur gear 127, and the bevel gear 128, the two gears being rigidly attached to each other. Looking from the rear to the front of the unit, the bevel gear 128 in mesh with the bevel gear 119 causes a clockwise rotation of the bevel gear 119, the bracket 122 and the trough 125. This movement leaves the inside, bottom surface of the trough 125 on a level with the work table 261, and the support plate 228, in readiness to receive the left straight end of the bent strip or rod of dough.

The cam arm 110, in engagement with the cam 35, continues the upward movement until the small end of the pieces 82 and 83 contact the stop pins 116. This leaves the trough 91 holding the bent strip or rod of dough in a horizontal position on the top of the unit in alignment with the guides 232, 233 and 234, the left trough 125, and the right trough 124. Since the stop pins 116 cause an obstruction to the pieces 82 and 83, and the cam arm 110 continues its movement, the pinions 84 rotate clockwise independent of the pieces 82 and 83, the segments 86 rotate counter-clockwise, the studs 96 with all of their rigidly connected parts move rearward in the slots 82A and 83A, causing the trough 91 to move rearward while the bending piece 89 is at a stilled position. The bent strip or rod of dough is now lying in the troughs 124 and 125, on the plate 228, close to the front outer contour of the guides 232, 233 and 234. The cam arm 110 is moved downward by the cam 35, moving all the component parts of the cam arm 110 to their neutral positions. Looking from the rear to the front of the unit, cam arm 134 continues movement upward, and the trough 125, carrying the left straight end of the strip or rod of dough, rotates clockwise approximately 180 degrees, placing the end of the dough on the work table 261, between the guides 279 and 280, at a position 90 degrees from the former. This operation is seen in Figure 8B, unit C. The dough now has the shape as shown in Figure 3. The cam arm 286, engaged with the cam 32, raises the guide 279 a distance suitable for keeping the end of the dough in location. The cam arm 290, engaged with the cam 30, raises the guide 280 a distance suitable for keeping the end of the dough in location. The cam arm 134 is moved downward, returning the trough 125 to its neutral position. The cam arm 133 continues movement upward, and the trough 124, carrying the right straight end of the strip or rod of dough, rotates counter-clockwise approximately 180 degrees, placing the right end of the dough across the left end of the dough on the work table 261, between the guides 278 and 280, at a position 90 degrees from the former. This operation is seen in Figure 8B, unit D. The dough now has the shape as shown in Figure 4. The cam arm 281, engaged with the cam 27, raises the guide 278 a distance suitable for keeping the end of the dough in location. The guide 280, being in the raised position, also keeps the end of the dough in location. The cam arm 133 is moved downward, returning the trough 124 to its neutral position. The dough now has the shape as shown in Figure 14, the loop section enclosed around the guides 232, 233 and 234, while the ends form an X.

In preparation for the twisting movement, the cam arm 246, attached to the support plate 247, and engaged with the cam 29, moves downward a suitable distance away from the pusher rods 236 and 237. The cam arm 196 engages with the cam 23, and moves upward. The cam arm 196, being connected to the lever 186, which is attached rigidly to the shaft 181, rotates the shaft 181 clockwise. The gear segments 182 and 184, attached rigidly to the shaft 181, rotate clockwise. The segments 182 and 184, being in mesh with the gear segments 175, cause rotation counter-clockwise of the segments 175. Since the segments 175 are rigid on the shafts 172, and the track 173 is rigid on the shafts 172, the track 173 moves counter-clockwise. The brackets 164 and 165 rotate counter-clockwise on their axis, the screws 166, when either is in the angular position as the bracket 165, is shown in Figure 21. The connections of brackets 164 and 165 to the tracks 173 and 170 are obtained by the ears 164A and 165A. The brackets 157 and 158, connected with the links 163 to the brackets 164 and 165, rotate counter-clockwise on their axis, the screws 159, when either is in the upright position, as the bracket 158, shown in Figure 21, and when either is in the horizontal position, they are a rigid support, retained by the rigid track 170, as the bracket 157, shown in Figure 21. The plate 228, and the guides 232, 233 and 234, which are attached to the bracket 158, take a like movement. The arms 190, which support the plate 197, rotate counter-clockwise on their axis, the shaft 192, by their connection to the gear segments 182 and 184. The upward movement of the cam arm 196 continues until the plate 197 comes in contact with the tops of the guides 278, 279 and 280 in the work table 261, and the upright plate 228 comes down to a horizontal position in alignment with the plate 228 on the rigid support 157, permitting a space between the plates 228, suitable as a clearance for the loop section of the dough, and forcing the guides 232, 233 and 234, which come in contact with each other in the upper and lower plates 228, to depress the required distance, an equal amount to provide for the clearance space above mentioned. This operation is seen in Figure 8B, unit E. The cam arm 286, which is connected to a center moving section 267 of the work table 261, engages with the cam 31, and moves downward a suitable distance, providing clearance for rotating the dough while making the twist. The unit is now ready to start the twist movement.

The cam arm 179 engages with the cam 26 and moves upward. The lever 153 rotates clockwise because of its connection with the cam arm 179. The lever 153, being engaged with the male clutch piece 143, causes the male clutch piece 143 to slide on the square section of the shaft 142, thus engaging itself with the female clutch piece 144. The cam arm 177 engages with the cam 33, and moves upward. The gear segment 149, through its connection with the cam arm 177, rotates clockwise on its axis, the screw 150. The spur gear 146, in mesh with the segment 149, rotates counter-clockwise. The bevel gear 147, indirectly a part of gear 146, also rotates counter-clockwise. The bevel gear and clutch piece 144, which is in engagement with the clutch piece 143, forming a lock connection to the shaft 142, is in mesh with the bevel gear 147, and looking from rear to front, it is rotated clockwise 180 degrees. This operation is seen in Figure 8B, unit F. In this rotation all component parts on the shaft 142 rotate, resulting in the dough acquiring a twist at the junction of the former crossed ends. The cam arm 286, with the center section 267 of the work table 261, moves upward a distance suitable for the support of the twisted section of the dough. The dough now has the shape as shown in Figure 5.

The cam arm 179 moves downward, releasing the clutch piece 143 from the clutch piece 144. The cam arm 177 moves downward, rotating the bevel gear and clutch piece 144, looking from rear to front, counter-clockwise, free on a round section of the shaft 142, to a neutral position. The cam arm 246, with the plate 247, moves upward, forcing the push rods 239 and 237, with the guides 232, 233 and 234, in the plate 228, attached to the bracket 158, against the guides 232, 233 and 234, in the plate 228, attached to the bracket 157. This movement removes the guides 232, 233 and 234 in the plate 228, attached to the bracket 157 from the loop section of the dough, replacing same with the guides 232, 233 and 234 in the plate 228, attached to the bracket 158. The plate 197, and the plate 228, attached to the bracket 157, and their component parts return to their neutral positions as the cam arm 196 moves downward. The unit now prepares for the fold movement.

The cam arm 225 engages with the cam 22, moving upward. The cam arm 225 is connected to the lever 223, which is attached rigidly to the shaft 218. This produces a clockwise rotation of the shaft 218, to which is attached rigidly the spiral segment cams 221. Engaged with cams 221 are the rolls 217, which are attached to the levers 214. From the clockwise rotation of the right segment cam 221, the right lever 214 is rotated, looking from the rear to the front, counter-clockwise, on its axis, the screw 215. From the clockwise rotation of the left segment cam 221, the left lever 214 is rotated, looking from the rear to the front, clockwise on its axis, the screw 215. The rolls 212, attached to the levers 214, engage with grooved collars 205, which are attached rigidly to the shafts 201. As the shafts 201 are moved toward the center of the unit, the engagement pieces 204, attached rigidly to the inner ends of the shafts 201, engage with the plate 228 on the bracket 158, and provide a rigid lock thereto while generating the fold movement. In the movements of the shafts 201 toward the center of the unit, the clutch pins 202, which are assembled rigidly in the outer ends of the shafts 201, are engaged with the clutches 199A, which are a part of the spur gears 199. The plate 228, which is engaged with the pieces 204, is now released from its attachment to the bracket 158.

The cam arm 211 engages with the cam 36, moving upward. The cam arm 211, being connected to the gear segment 207, which is assembled rigidly with the gear segment 208, on the shaft 192, causes a clockwise rotation of the shaft 192, and the segments 207 and 208. The spur gears 199, engaged with the shafts 201, by their clutch sections 199A, and in mesh with the segments 207 and 208, cause a counter-clockwise rotation of the shafts 201, and the plate 228, which is supporting the loop section of the dough.

The cam arm 211 continues the upward movement until the plate 228 is parallel with and above the work table 261. The guides 232, 233 and 234, in the plate 228, are now in alignment vertically with the guides 278, 279 and 280 in the work table 261. This operation is seen in Figure 8C, unit G. The dough now has the shape as shown in Figure 6.

The cam arm 298 engages with the cam 28 and moves upward. The cam arm 298, attached rigidly to the plate 296, which has the two erect pins 295, continues upward until the pins 295 pass through the apertures 267A, in the center section 267 of the work table 261, and penetrate through the end sections of the dough, and approximately half the diameter of the loop section, causing adhesions of the ends to the loop section of the dough. The cam arm 298, and its component parts, return immediately to the neutral position by a downward movement.

The cam arm 273, and the attached guide 280, the cam arm 281, and the attached guide 278, and the cam arm 286, and the attached guide 279, all move upward a distance suitable for removing the guides 232, 233 and 234 from the pretzel. The cam arm 211 moves downward, returning all of its connecting parts to their neutral positions. Immediately following, all parts which are in operating positions are returned to their neutral position. The completed pretzel is now ready for removal from the unit and machine.

The cam arm 302 engages with the cam 25, moving upward. The cam arm 302, being connected to the lever 252, which is assembled rigidly with the lever 251, on the tubular shaft 219, causes a clockwise rotation of the shaft 219, and the levers 251 and 252. Connected to the levers 251 and 252 are the locking levers 255, which are engaged by the attached rolls 260, in the slots in the sides of the work table 261. The locking levers 255 rotate clockwise. As the cam arm 302 continues the upward movement, the work table 261 rotates counter-clockwise on its axis, the tubular shaft 219, to an angle suitable for the removal of the pretzel by its own gravitation. This operation is seen in Figure 8C unit H. The pretzel slides down the rear extended section of the work table 261 on to a conveyor belt 40, running lengthwise in the machine bed.

The cam arm 302 now moves downward, and the work table 261, and its component parts return to the neutral position. The conveyor belt 40 conveys the inverted pretzel rearward, and as the pretzel continues around the rear end of the conveyor, it leaves the conveyor belt 40, sliding on an inverting chute 42, which causes the pretzel, of its own gravitation, to turn right side up on the conveyor belt 52, running crosswise through the base of the machine. The conveyor belt 52 conveys the pretzel, right side up, through an opening in the right side of the machine base, to any location convenient for the operations of dipping, salting and baking. The pretzel is in the shape shown in Figure 7. In the foregoing the operation of the several parts have been described with particular reference to Figures 1 to 7, Figures 8A, 8B and 8C showing the general machine assembly, and the several detailed figures; however, in order that the major motivating elements may be conveniently emphasized, with reference to the shape of the pretzel and its position on the work table of the machine, reference is now made particularly to Figures 1 to 7, Figures 1A to 6A, and Figures 24A to 24D.

The stage in operation defined in unit A, Figure 8A, i. e. the "bending stage" forms the pretzel, in conjunction with the operation defined as unit B, Figure 8A, in the shapes shown in Figures 2, 2A and 2B, Figure 2B showing its position on the work table with reference to the several guides. The motivating structure largely responsible for this operation is shown in Figure 24A, and which includes the cam arm 110, gear segment 101, pinion 84, gear segment 86, pin 96, spring 100, and the trough and floor detailed structure shown particularly in Figures 9, 9A and 10 in perspective. Thus the dough rod or strip, shown in Figures 1A and 2A having been stripped off the retaining shelf on hopper is received in the trough 91, and takes the shape of the floor 89, whence cam arm 110 is activated to move the trough to a position to dislodge the rod or strip and deposit it on the work table in the position shown in Figure 2B, the parts largely responsible for this movement being set forth in Figure 24A, and in Figures 9, 9A and 10.

Referring now to Figures 3A and 4A, and Figures 24C, 1 and 2, the respective troughs 124 and 125 are motivated through the instrumentality of cam arm 133, rack segment 130, and the companion cam arm 134, and rack segment 131, and gears and pinions shown in Figure 24C—1 to cross the lengths of dough on the work table as shown in Figure 4A, and in Figure 4, and as described with reference to Figure 8B, unit D.

The twisting movement per se cannot yet take place although the body of dough is in the initial position on the work table for twisting since the means for holding the ends of the dough and the loop section of dough in position for the twisting operation must first be actuated to their operative positions, and this includes the member 190, and the guides 232, 233, and 234, and plate 228 attached to support 158. Therefore referring to Figure 24C it will be seen that arms 190 with support plate 197 rotate on the shaft 192 through connection with gear segments 182 and 184, until plate 197 contacts with 278, 279, and 280 on the work table 261, suitable clearance being provided. Also the plate 228 attached to support 158 rotates until parallel with the plate 228 attached to the support 157, suitable clearance for the dough being provided, and the guides 232, 233, and 234 in the plate 228 attached to the support 158 are in direct vertical alignment with the guides 232, 233 and 234 in the plate 228 attached to the support 157. Cam arm 179 shown in Figure 24C is now motivated to engage clutch elements 143—144, and cam arm 177 is motivated to turn shaft 142 through the instrumentality of rack segment 149 and gear 146 to twist the dough body and give it the shape shown in Figure 5 and Figure 5A, and as described with reference to Figure 8B, unit F.

The folding movement shown in the skeleton diagram of Figure 24D, and in Figures 16A, 15A and 15B, completes the shape of the pretzel. The principal motivating parts for this movement are described in detail with reference to the structure of those parts, but briefly stated they include cam arm 225, connected with lever 223, which in turn is attached to shaft 218 carrying spiral segment cams 221 which are engaged by rolls 217 attached to levers 214. As the cams are rotated clockwise, rotating levers 214, and screws 215, rolls 212 attached to levers 214 engage collars 205 attached to shafts 201, and as shafts 201 move toward the center of the unit pieces 204 thereon engage plate 228 and constitute a lock. Clutch pin 202 on shaft 201 engages clutches 199A. Plate 228 is released from attachment to bracket 158, cam arm 211 moves upward. Gear 207 connected thereto induces rotation in a clockwise direction of shaft 192, and segments 207—208. Spur gears 199 engaging shafts 201, through the instrumentality of clutch sections 199A, and in mesh with segments 207—208, cause a counter-clockwise rotation of shafts 201, and plate 228 supporting the loop of the dough body. Movement of cam arm 211 is continued until plate 228 is parallel with work table 261, with guides 232, 233 and 234 in plate 228 in alignment with guides 278, 279 and 280 in work table 261, thereby completing the shape of the pretzel as clearly shown in Figure 6, the positions of the plate 228 and work table and the several guides being shown in Figure 8C, unit G. In this position, however, the pretzel is upside down, but as the machine continues in its operation the pretzel is reversed to the right-side up position through the instrumentality of dumping of the work table and the position assumed by the pretzel through the inverting chute 42 discharging to the crosswise conveyor belt 52, the dumping and inverting operation being shown in Figure 8C, unit H.

Again referring to Figure 8C, and also Figures 16A and 16B, it will be noted that the units after completing the above described operations are carried by the chain and track to the starting position shown in Figure 8A, and in order to take up any loose motion, and otherwise hold the various operating parts in the correct neutral position we have provided retaining springs 320, shown in Figures 16A and 16B; these springs are attached to the frame of the unit, as shown, and to a major motivating part of each set of operating parts of a unit.

From the foregoing it is believed that the operation, construction of the various parts, and the advantages of our multi-unit type of machine will be apparent, and in conjunction therewith it is again pointed out that any number of units may be assembled depending on the quantity of production desired; however it is to be understood that there is only one set of cams regardless of the number of units.

In connection with the single unit machine shown conventionally in Figure 25, the construction of the several parts of the pretzel making unit are identical with any one of the units of the multi-unit machine, including the number and positions of the various cam arms for motivating the parts carrying forward the various stages of bending, twisting and folding a pretzel; however with a single unit machine the actuating mechanism for the cam arms, and the mechanical organization of the machine assembly is different since the pretzel making unit itself remains stationary, while the cam arms are actuated through the use of rotary cams (as shown) or reciprocating cams or any other form of mechanical arrangement which will impart to the structural organization of the pretzel making unit its proper action in the necessary sequence. As previously pointed out the single unit machine is preferably used in conjunction with a well known type of pretzel dough rolling machine, and preferably the proper timing of operation between the two machines, or synchronism, may be had by hooking each machine to a common power element as shown in Figure 25. Such a machine is desirable for small bakers and the like, and can be manufactured, sold and set up very inexpensively, and will turn out enough pretzels for the uses of a medium sized establishment.

It is again pointed out that changes may be made in size, form, shape, mechanical arrangement, and construction of parts without departing from the spirit of our invention or its broad concept, furthermore while a multi-unit machine of a certain number and arrangement and form of units and operating structure has been shown and described herein, it is manifest that variations in practical application will dictate the number of units in a machine assembly, and will perhaps necessitate changes in timing, organization and the like to conform to necessities of production and shop practice; therefore in interpreting the scope of our invention, reference is to be had to the subjoined claims.

We claim:

1. A pretzel machine comprising a plurality of substantially identical pretzel forming units, each unit having means for bending a rod of dough at substantially its middle point, forming said bent piece of dough with a loop and crossed ends, twisting the dough at the point where the ends cross, and then folding the looped portion on the twisted ends to complete the shape and conformation of a completed pretzel, means for moving said units continuously about a predetermined path, camming elements, and each of said units having separate operative parts engaging respectively each of the several camming elements to independently actuate the means for bending, crossing, twisting and folding the dough in predetermined sequence as the units progress on the path of travel.

2. A pretzel machine comprising a plurality of substantially identical pretzel forming units arranged in proximity end to end, means for moving said units continuously about a predetermined path, each unit having means for receiving a relatively straight strip of dough, means for bending said strip of dough at approximately its middle point, means for crossing the ends of a bent strip of dough, means for twisting the dough at the point where the ends cross, and means for folding the crossed and twisted ends on the looped intermediate portion, a camming element having a plurality of separate camming parts, and operative connections from each of the aforementioned means respectively to the several camming parts of the camming element whereby when said units are moved on their predetermined path, the various means will be actuated to perform their operations in sequence to produce a finished pretzel form in condition for dipping, salting and baking.

3. A pretzel machine comprising a plurality of substantially identical pretzel forming units arranged to follow each other about a predetermined path, means for moving said units, each of said units being made up of a plurality of relatively independent dough forming means, one of said means of each unit having sloping portions receiving the strip of dough, said strip bending of its own weight to conform to the shape of the sloping portions, another means for crossing the ends of a bent strip of dough, another means for twisting the dough body after the ends are crossed, and another means for folding the twisted dough body into the shape and conformation of a finished pretzel, an actuating device carried by the machine and having separate camming surfaces, and operative connections leading from each of said aforementioned several means to each of the several camming surfaces of said actuating device whereby said means are caused to operate as the units move on their path of travel.

4. A pretzel machine comprising a plurality of substantially identical pretzel forming units arranged to follow each other about a predetermined path, means for moving said units, each of said units having a member formed with oppositely sloping sides for bending a strip of dough, means for crossing the ends of a bent strip of dough, means for twisting the dough body after the ends are crossed, and means for folding the twisted dough body into the shape and conformation of a finished pretzel, cam means located in the path of travel of the several units, and independent cooperating cam elements from the aforementioned several means for bending, twisting, and folding the dough to the said cam means for actuating said bending, twisting and folding means as the units move along their path of travel.

5. A pretzel machine comprising a pretzel forming unit having means over which a strip of dough is disposed to bend the same at relatively its middle point, means for lifting the ends of the bent strip of dough and moving the same to cross the ends thereof, means for twisting the dough at the point where the ends are crossed, and means lifting and folding the twisted dough to form said dough into the shape and conformation of a finished pretzel, and means for actuating said aforementioned means to complete said operations without squeezing, pressing or otherwise destroying the context of the dough.

6. The combination with a machine for forming a strip or rod of dough of the type used in the formation of a pretzel, a pretzel making machine having means for receiving the relatively straight strip or rod of dough from the machine forming the same, an angular trough like member beneath the receiving means into which said straight strip or rod of dough is placed for forming a bend in the rod or strip of its own weight, means for crossing the ends of the bent dough, means for twisting the crossed ends, and means for folding the same to conform in shape and configuration to a finished pretzel, means for actuating the crossing, twisting and folding means, and means for moving the bent strip of dough into position to cross the ends thereof.

7. The combination with a machine for forming a strip or rod of dough of the type used in the formation of a pretzel, a pretzel making machine comprising a toothed member for removing the rod or strip from the forming machine, a member beneath the removing means formed to provide a bend in the rod or strip of its own weight, separate lifting means engaging each of the respective ends of the bent dough and placing them in crossed position to form a semi-twist, means for completing the twisting of the dough at the crossed point, means for folding the same to conform in shape and conformation to a finished pretzel, means for actuating the crossing, twisting and folding means, and means for shaping the looped portion of the dough between the crossed ends, and maintaining the angular relationship of the crossed ends during the twisting and folding operations.

8. The combination with a machine for forming a strip or rod of dough of the type used in the formation of a pretzel, a pretzel making machine comprising a member for receiving the dough from the rod forming machine, means forming a bend in the rod or strip of its own weight including a vertically positioned trough having side portions sloping down from a central high point, means for moving the trough to a horizontal position, a work table, means for ejecting the bent dough to position on the work table, separate means for lifting each of the respective ends of the bent dough and placing them in crossed position on the work table, means for twisting the dough at the crossed point, means for folding the looped portion on the crossed ends and means for actuating said foregoing means.

9. The combination with a machine for forming a strip or rod of dough of the type used in the formation of a pretzel, a pretzel making machine comprising a member for receiving the rod or strip of dough from the rod forming machine, means for trimming the ends of the rod or strip of dough to conform to a predetermined length for the formation of a pretzel, means for bending the rod or strip, means for crossing the ends of the same, means for preserving the shape of the looped end of the dough after the ends are crossed, means for maintaining a predetermined angularity between the crossed ends, means for twisting the dough at the crossed point, means for folding the dough so that the looped end is upon the crossed ends in the shape and conformation of a completed pretzel, movable elements adapted to be projected into the dough for adhering the crossed ends to the looped portion, and means for actuating the foregoing means.

10. The combination with a machine for forming a strip or rod of dough of the type used in the formation of a pretzel, a pretzel making machine having a normally positioned vertical part for receiving the rod or strip, means for bending the rod or strip while in a vertical position, a work table, means for moving said receiving means to eject said rod or strip on a horizontal position on said work table, means for trimming the ends of the rod or strip during the movement from a vertical to a horizontal position, means for crossing the ends of the bent strip, means for twisting the crossed ends, means for folding the dough body, and means for actuating the aforementioned parts.

11. A pretzel making machine comprising a plurality of units each having a substantially identical mechanical organization, each unit having means for bending a rod or strip of dough, means for crossing the ends of the bent strip, means for holding the ends of the crossed strip in position, means for maintainng the shape of the looped portion, means for twisting the dough at the point where the ends cross, means for folding the looped portion on the crossed ends, and means for adhering the ends to the looped portion, said units arranged to follow a predetermined path, means for moving said units along said path, a cam mechanism, and means connecting said several aforementioned means with the cam mechanism whereby when said units are moved along said path said means will be actuated to perform the operations herebefore referred to.

12. A pretzel making machine comprising a plurality of substantially identical pretzel making units, each having means for bending a strip of dough, means for crossing the ends of a bent strip of dough, means for maintaining the positions of the crossed ends of dough, means for preserving the shape of the looped part between the crossed ends, means for twisting the dough at the crossed point, means for moving a part of said shape preserving element for creating clearance for the rotating dough when the twisting operation is carried out, means for maintaining the crossed ends in position during the twisting operation, means for folding the looped part on the crossed ends, means for withdrawing the loop shaping portions during the folding operation, said units arranged in end to end relationship, means for moving said units in a predetermined continuous path of travel, an actuating element, and the several aforementioned means in said units connected to the actuating element whereby when said units are moved along their path of travel said means will be actuated to carry out the operations aforementioned.

13. In a pretzel making machine having a plurality of pretzel making units arranged to travel in a continuous path, said units being substantially identical in construction, each unit having a work table, guides on the work table for receiving a dough body, means for bending a strip of dough, means for crossing the ends of the bent strip, means for twisting the dough body at the crossed point, an element supporting the looped portion between the crossed ends, said element mounted for rotational movement to form a twist in the dough body, means for lifting said supporting and twisting portion to superpose the same over the work table to form a fold in the body so that the looped portion is upon the crossed ends, means for adhering the ends to the looped portion, an actuating element, and means connecting said aforementioned means with the actuating element whereby when said units are moved in their path of travel said means will be actuated to carry out the operations aforementioned.

14. A pretzel machine comprising a plurality of substantially identical pretzel forming units arranged to follow each other about a predetermined path, means for moving said units on their path of travel, means carried by each unit and having oppositely and downwardly extending side portions for bending a rod or strip of dough at about its center point, means for trimming the ends of the bent dough, means forming a work table on which the bent dough is positioned, separate means engaging the ends of the bent dough and movable for crossing the ends of the bent strip, means forming a uniform looped portion between the crossed ends, means for rotating the looped portion to form a twist at the point where the ends cross, means for maintaining the angular positions of the crossed ends, means for folding the looped portion on the crossed ends, and means for withdrawing the loop forming portions and the crossed end position maintaining portions when the dough body is folded, an actuating element, and operative connections from said foregoing means to the actuating element whereby said means are operated as the units follow each other along their path of travel.

15. In a pretzel making machine, a frame, a plurality of cam elements carried by the frame, an endless chain belt operatively mounted on the frame, means for actuating said chain belt, a plurality of substantially identical pretzel making units connected with said chain belt, a track supporting said pretzel making units, each unit having means for bending a strip of dough, means for crossing the ends of the bent strip, means for twisting the dough body at the crossed point, means for folding the dough body into the shape and conformation of a finished pretzel, and operative connections on each of said means engaging in said respective cam elements whereby said means are actuated in sequence as the units are moved along the track by the chain belt.

16. In a pretzel making machine, a sectional frame, a plurality of cam elements carried by the frame, an endless sectional track carried by the frame, an endless chain belt on the frame, and means for actuating the belt, a plurality of pretzel making units of substantially identical construction positioned on the track; said track and frame being built up to accommodate any predetermined number of pretzel making units, said units connected to the chain belt to be moved one after the others about the track, each unit having means for receiving a strip or rod of dough, means for bending said strip or rod substantially at the center point, means for crossing the ends of the bent dough body, means for maintaining a uniformly shaped looped portion between the crossed ends, means for rotating the looped portion to form a twist at the crossed point, means for folding the looped portion on the crossed ends, and each of said aforementioned means having an operative connection with the respective cam elements whereby said means are actuated as the units are moved along their path of travel.

17. In a pretzel making machine, a frame, a plurality of cam elements carried by the frame, an endless track member carried by the frame, an endless chain belt on the frame, means for actuating the belt, a plurality of pretzel making units of substantially identical construction, said units being formed with integrated coactive parts designed respectively to bend, cross, twist, and fold a strip of dough to conform to the shape of a completed pretzel, and each of said parts having operative independent connections with the respective cam elements to be actuated as the units are moved along their paths of travel.

18. In a pretzel making machine, the combination of a knockdown sectional frame, the number of sections of which may be increased or decreased to regulate the size of the frame to conform to the desired capacity of the machine, a plurality of fixed cam elements carried by the frame, a knockdown endless track member carried by the frame, an endless chain belt operatively supported on the frame, means for driving the belt, a plurality of pretzel making units of substantially identical construction carried by the track member at predetermined distances apart on the frame and connected with the chain belt to be moved along the track, the number of units governing the capacity of the machine and conforming to the size of the frame, said units being formed with integrated coactive parts designed respectively to bend, twist and fold a strip of dough to conform to the shape of a completed pretzel, said parts having independent operative connection with the respective cam elements to be actuated as the units are moved along their paths of travel, and said cams arranged to actuate said parts in predetermined sequence maturing into the formation of a completed pretzel.

19. In a pretzel making machine, a frame, a plurality of cam members carried by the frame, an endless track member carried by the frame, an endless chain belt on the frame, a plurality of substantially identical pretzel making units carried by the track and connected with the belt to be moved along the track; each pretzel making unit having a trough mounted for pivotal movement and adapted to receive a strip or rod of dough in its vertical position and dispense the same in its horizontal position, said trough having means for permitting bending of the strip at substantially its central point of its own weight, means engaging said bent strip when ejected at the horizontal position for crossing the ends of the strip, means for shaping the looped portion between the crossed ends, means for rotating the looped portion to form a twist at the crossed point, means for folding the looped portion on the crossed ends to the form and shape of a complete pretzel, and said aforementioned means having operative connections to the respective cams to be actuated in sequence as the units follow their path of travel.

20. In a pretzel making machine, a frame, a plurality of cam members carried by the frame, an endless track member carried by the frame, an endless chain belt on the frame, a plurality of substantially identical pretzel making units carried by the track and connected with the belt to be moved along the track; each pretzel making unit having means for receiving a rod or strip of dough and bending the same at substantially its central point, a support for each of the ends of the bent strip, comprising a pivoted trough member arranged to carry each end of the bent strip over and across the line between the ends of the bent strip thereby to cross said ends, a guide member for shaping the looped portion between the crossed ends, a rotatable support for the guide member designed to form a twist in the dough body at the point where the ends cross, means for moving said latter member to fold said looped portion on the crossed ends to the form and shape of a complete pretzel, and said aforementioned means having operative connections to the respective cams to be actuated in sequence as the units follow their path of travel.

21. In a pretzel making machine, a frame, a plurality of cam members carried by the frame, an endless track member carried by the frame, an endless belt on the frame, a plurality of substantially identical pretzel making units carried by the track and connected with the belt to be moved along the track, each pretzel making unit having means for receiving a rod of dough and bending the same at substantially its central point, means for crossing the ends of the bent strip of dough, a rotatable member having a plurality of retractable guides for forming and maintaining the looped portion between the crossed ends, said rotatable member being formed with hingedly connected parts normally in the open position, said parts each having guides and moving to a closing position to retain the looped end, means for twisting the dough body when the ends are crossed, the guides being retractable to release the looped end, said parts being movable to a position over the crossed ends to form a fold in the dough body, locking means for said parts, and each of said aforementioned means having an operative connection with the several cam elements whereby when the units are moved along the track said parts are actuated in sequence to form and shape a completed pretzel.

22. In a pretzel making machine, a frame, a plurality of cams carried by the frame, an endless track member carried by the frame, an endless chain belt on the frame, a plurality of substantially identical pretzel making units carried by the track and connected with the belt to be moved along the track, each pretzel making unit having means for receiving a rod or strip of dough and bending the same at substantially its middle point, means for crossing the ends of the bent strip, means for twisting the dough body at the crossing point, and a member having hingedly connected similar parts formed with retractable guides engaging the looped part of the dough body, said member having a connection with a rotatable element operable during the twisting operation, said member being disengageable from adjacent cooperating parts, and a pivoted locking lever engaging said member to move it to a position above the crossed ends thereby to form a fold in the dough body to position the looped portion over the crossed ends in the shape and conformation of a completed pretzel, and operative connections from said aforementioned members to the cam element whereby said members are actuated in sequence as the units are moved along the track.

23. In a pretzel making machine, a frame, a plurality of cam elements carried by the frame, an endless track member, an endless belt on the frame, means for actuating the belt, a plurality of substantially identical pretzel making units carried by the track and connected to the belt, each pretzel making unit having means for bending a strip or rod of dough, means for crossing the ends of the bent strip, means forming a twist at the crossed point, and means folding the dough body so that the looped portion between the crossed ends is superposed on the crossed ends, and a plurality of guide members for maintaining the positions of the crossed ends and forming and maintaining the position of the looped portion between the crossed ends, said guides being mounted for movement to an operative and an inoperative position as the dough body is processed thereby to maintain the shape and conformation of the pretzel at various stages in its formation without squeezing or otherwise injuring the texture of the dough, and operative connections from said aforementioned parts to the cam elements whereby said parts are actuated as the unit moves along the track.

24. In a pretzel making machine, a frame, a plurality of cam elements carried by the frame, an endless track member, an endless belt on the frame, means for actuating the belt, a plurality of substantially identical pretzel making units carried by the track and connected to the belt to be moved along the track, each unit having a frame with wheeled connections to the track, a pivoted work table on which a strip of dough for making a pretzel is formed, and an extension on the pivoted work table, means for holding the work table in operative position, each unit having means for bending a strip of dough, means for crossing the ends of the bent strip, means for forming a twist at the crossed point and means for folding the looped portion between the ends over upon the crossed ends to complete the formation of a pretzel bottom-side up, means for releasing said work table to move the same about its pivot point to eject the pretzel therefrom in a right-side up position, and operative connections from the aforementioned parts to the cam elements whereby said parts are actuated as the units proceed on their paths of travel.

25. In a pretzel making machine, a frame, a plurality of cam elements carried by the frame, an endless track member, an endless belt on the frame, means for actuating the belt, a plurality of substantially identical pretzel making units carried by the track and connected to the belt to be moved along the track, each pretzel making unit having means for receiving a rod or strip of dough, means for positioning and retaining said rod or strip and preventing displacement of the same through impact, vibration or the like, means for bending said strip including a trough and a movable floor in the trough, both having sloping sides leading from a center high point, means for ejecting said bent strip from the trough including frames carried by the trough and floor and connected by a spring member only, and inter-geared operating parts operatively connected respectively with the trough and the floor, said trough being mounted for pivotal movement, and said intergeared operating parts being effective on pivotal movement of the trough and floor to cause the trough to be retracted from the floor against the resistance of said spring so that the bent strip will be discharged therefrom of its own weight, a work table on which said bent strip is received, means for crossing the ends of said bent strip, means for rotating the looped portion of the strip to form a twist at the crossed portion, means for folding the looped portion on the crossed ends, and operative connections from said intergeared operating parts and said crossing, twisting and folding means to said cam elements whereby said parts are actuated as the unit follows its path of travel.

26. In a pretzel making machine, a sectional frame, a plurality of cam elements carried by the frame, a sectional track member, an actuating member beneath the track member, a plurality of substantially identical pretzel making units carried by the track member and connected with the actuating member to be moved along the track, each of said units having means for bending a rod or strip of dough, means for crossing the ends of the bent strip, means for forming a twist at the crossed point, means for folding the looped part between and upon the crossed ends to the form and shape of a completed pretzel, operative connections from each of said means to the cam elements whereby to actuate the same as the unit is moved along the track and the sections of said frame and track members being removable and replaceable to vary the size of the machine as indicated by the number of pretzel making units to be carried thereby.

27. In a pretzel making machine, a frame, a plurality of pretzel making units carried on the frame, each of said units being substantially identical in construction and each unit formed to complete all of the operations necessary to the shaping of a pretzel from a strip of dough, means for moving said units on the frame, and each of said units having movable parts to receive the relatively straight strips of dough forming the pretzel and angular means forming a bend in the strip of dough by reason of the weight of the dough, the movement of said parts lifting the bent strip of dough supported thereon to dispose said strips without gripping or pressing to positions for subsequent handling of the strips, next crossing the bent ends, next twisting the dough body at the crossed point, and finally lifting the looped part and depositing it upon the crossed ends thereby completing the form and shape of a conventional pretzel without pressing, or otherwise injuring the context of the dough, an operating unit carried by the frame, and connections from each of said above means to the operating unit whereby as said units are moved on the frame said means are actuated to shape and form the pretzel in the manner aforementioned.

28. A pretzel making machine comprising a supporting frame, a power unit, a plurality of movable cams connected with the power unit, said pretzel making machine having means for bending a strip of dough, means for crossing the ends of the bent strip, means for rotating the looped portion between the crossed ends to form a twist at the crossed point, means for folding the looped portion on the crossed ends, and reciprocable pins for pressing into the dough for adhering the crossed ends to the looped portion, said means having operative connection with said movable cams whereby to be actuated thereby in predetermined sequence to form a pretzel.

29. A pretzel making machine comprising a supporting frame, an actuating element, means including an angular member on which a strip of dough is deposited for bending said rod or strip of dough through its own weight, means including a pair of members each supporting an end of said strip and movable for crossing the ends of the bent strip, means for rotating the looped portion to form a twist at the crossed point, means for folding the looped portion on the crossed ends, and means pressing through the dough at the completion of the foregoing operations for adhering the crossed ends to the looped part, and connections between all of said means and the actuating element whereby said means are actuated in predetermined sequence to form a pretzel.

30. A pretzel making machine comprising a supporting frame, an actuating member, means for receiving a relatively straight strip of dough, an angular floor like member on which said strip is deposited for bending said rod or strip of dough, independent means supporting the ends of the bent strip of dough and movable for crossing the ends of the bent strip, means for rotating the looped portion to form a twist at the crossed point, means for folding the looped portion on the crossed ends, and connections between said means and the actuating member whereby said means are actuated in predetermined sequence to form a pretzel, in combination with means for forming a rod or strip of dough and delivering said rod or strip of dough to the pretzel machine.

31. In a pretzel making machine, means forming a loop midway the crossed ends of a strip of dough, and a twist between the crossed ends and the loop, and member engaging the looped portion and mounted for movement to a position above and in proximity with the crossed ends thereby to fold the looped portion on the crossed ends, a shaft, clutch members, rotatable plates on the shaft operatively connected with the clutch members, locking means on said loop engaging member comprising springs and projections thereon, said plates having camming surfaces engaging the projections, and means engaging the shaft and clutch members for moving the plates into and out of engagement with the locking members to move said loop engaging member in position to fold the loop down upon the crossed ends.

32. In a pretzel machine, means forming a bend in a rod or strip of dough, means for crossing the ends of the bent rod or strip of dough, means engaging the looped portion between the crossed ends, shafts each carrying a clutch member and a gear, a pin connecting each clutch member with each shaft, levers engaging the respective clutch members, a rack engaging each gear, an actuating element, and connections between the levers and the actuating element, and the racks and the actuating element, whereby to throw in said clutches and rotate said shafts to turn said looped portion to form a twist in the dough body at the point where the ends cross each other.

33. In a pretzel machine, means forming a bend in a strip or rod of dough, and separate means receiving the respective ends of the bent rod or strip, said separate means having gear connections to pivoted gear segments, separate means for pivoting said segments, an actuating organization, and separate connections from said actuating organization to said segments whereby said end receiving means are moved at different periods, first to bring one end of the bent strip substantially parallel with the other end, and second to move the remaining end of the bent strip across and upon the first end to form a loop in the strip of dough with crossed ends of substantially equal length.

34. In a pretzel machine, means for receiving a strip or rod of dough, means forming a bend at substantially the middle portions of said strip or rod so that the ends of the strip or rod extend at substantially the same angle to each other, means for crossing the respective ends, means for shaping the looped portion between the respective crossed ends, and means engaging the looped portion and mounted for rotational movement, including a track member, and anti-frictional members on said loop engaging member engaging said track and adapted to operate thereon, a rotatable shaft engaging said latter member and designed to turn said member about its axis and in engagement with said track, said track being formed with cooperating pivoted sections, and said loop engaging member being formed with hinged sections designed to close upon and retain said loop, and actuating means for said members including connections to the hinged portions and the rotating shaft whereby said members are moved to retain the loop and turn with the shaft to form a twist at the point where the ends of the strip of dough cross each other, and means for folding the looped portion upon the crossed ends to complete the shape and conformation of a pretzel.

35. In a pretzel machine, a plurality of substantially identical pretzel making units, a sectional frame member the sections of which may be built up to accommodate any chosen number of pretzel making units, a sectional track member for the frame and on which the units operate, means for moving the units along the track, each of said units having means for receiving a relatively straight strip of dough from a dough machine, means including a bent floor like member on which the strip of dough is deposited to form a bend in the strip at about its middle point, separate and independently operating means supporting the ends of the bent strip and movable to cross said ends one over the other, means for forming a twist at the crossed point, and means supporting the loop between the crossed ends and movable to dispose said loop upon the crossed ends to complete shaping said dough in the form of a pretzel, and means for actuating said aforementioned means as the unit passes through the machine.

36. In a pretzel machine, a plurality of substantially identical pretzel making units, means supporting said units and adjustable in size to accommodate any given number of units, means for moving said units one after the other on said aforementioned means, each of said units having a bent trough-like member on which a strip of dough is deposited for forming a bend in said strip, separate means supporting the ends of the bent strip, said separate means being operable in sequence to cross said ends one over the other, means for twisting the dough at the crossed point, means for disposing the looped portion of the dough on the crossed ends, and means for actuating all of said aforementioned means in sequence.

37. In a pretzel making machine, a pretzel forming unit having a plurality of independently operable pretzel forming members, means for actuating said members in step by step sequence; one of said members formed to receive a strip of dough, said dough strip bending of its own weight to conform to the shape of the member, another member having means for lifting and crossing the ends of the bent strip of dough without squeezing or grasping the same or otherwise affecting the texture of the dough body, and another member having means for lifting and arranging the looped end of the dough body and placing it upon the crossed ends without grasping or squeezing the same thereby to produce the shape and conformation of a completed pretzel.

38. In a pretzel making machine, a pretzel forming unit having a plurality of independently operable pretzel forming members, means for actuating said members in step by step sequence; one of said members having oppositely sloping sides to receive a strip of dough thereon and bend the same of its own weight without squeezing, grasping or compressing or otherwise affecting the texture and inherent qualities of the dough or compacting its cellular structure; another member arranged to receive the bent strip from the first member and having means for lifting and crossing the ends of the strip without squeezing, grasping or compressing the same; another member having means for holding and turning the looped end of the dough body without squeezing, grasping or compressing the same to form a twist at the crossed point, and another member having means for lifting and placing the looped end of the dough body upon the crossed ends without grasping, squeezing or compressing the same or otherwise modifying the texture or cellular context of the dough body, thereby to produce the shape and conformation of a completed pretzel.

WILLIAM M. YOUNG.
LEMON BLAIR PAULES.